(12) United States Patent
Kim et al.

(10) Patent No.: US 10,970,900 B2
(45) Date of Patent: Apr. 6, 2021

(54) ELECTRONIC APPARATUS AND CONTROLLING METHOD THEREOF

(71) Applicant: Samsung Electronics Co., Ltd., Suwon-si (KR)

(72) Inventors: Jooyoung Kim, Suwon-si (KR); Hyunwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/299,728

(22) Filed: Mar. 12, 2019

(65) Prior Publication Data

US 2019/0279409 A1    Sep. 12, 2019

(30) Foreign Application Priority Data

Mar. 12, 2018  (KR) .................. 10-2018-0028603
Feb. 28, 2019  (KR) .................. 10-2019-0023901

(51) Int. Cl.
*G06N 20/00*    (2019.01)
*G06T 11/60*    (2006.01)
(Continued)

(52) U.S. Cl.
CPC ............ *G06T 11/60* (2013.01); *G06F 16/338* (2019.01); *G06F 16/3329* (2019.01);
(Continued)

(58) Field of Classification Search
CPC .... G06T 11/60; G06F 16/438; G06F 16/3329; G06F 16/338; G06F 17/2705; G06N 20/00; G06N 3/0454; G06N 3/08
(Continued)

(56) References Cited

U.S. PATENT DOCUMENTS 6,178,465 B1 *  1/2001  Shirai .................. G06T 1/20
                                                      710/1
9,310,964 B2    4/2016  Li et al.
(Continued)

FOREIGN PATENT DOCUMENTS

JP    1049529 A    2/1998
JP    5930229 B2   6/2016
(Continued)

OTHER PUBLICATIONS

Takeshi et al., "Document Preparing Device", JPH1049529, 1998. (Year: 1998).*

(Continued)

*Primary Examiner* — Dave Misir
(74) *Attorney, Agent, or Firm* — Jefferson IP Law, LLP

(57) ABSTRACT

An artificial intelligence (AI) system using an artificial intelligence model learned according to at least one of machine learning, a neural network, or a deep-learning algorithm, and an application, and a method of controlling an electronic apparatus therefor are provided. The method includes acquiring a text based on a user input, determining a plurality of key terms from the acquired text, acquiring a plurality of first illustrations corresponding to the plurality of key terms, acquiring a second illustration by synthesizing at least two or more first illustration of the plurality of first illustrations, and outputting the acquired second illustration.

20 Claims, 27 Drawing Sheets

(51) Int. Cl.
*G06F 16/438* (2019.01)
*G06F 16/332* (2019.01)
*G06N 3/04* (2006.01)
*G06F 16/338* (2019.01)
*G06F 40/205* (2020.01)

(52) U.S. Cl.
CPC .......... *G06F 16/438* (2019.01); *G06F 40/205* (2020.01); *G06N 3/0454* (2013.01); *G06N 20/00* (2019.01)

(58) Field of Classification Search
USPC .......................................................... 706/16
See application file for complete search history.

(56) References Cited

U.S. PATENT DOCUMENTS

| | | | |
|---|---|---|---|
| 9,411,830 | B2 | 8/2016 | Mei et al. |
| 10,055,097 | B2 | 8/2018 | Kurokawa et al. |
| 2008/0215310 | A1* | 9/2008 | Audant ............... G06F 17/2785 704/9 |
| 2012/0120097 | A1 | 5/2012 | Sun et al. |
| 2013/0151510 | A1* | 6/2013 | Hua ................... G06F 16/24578 707/723 |
| 2014/0172457 | A1* | 6/2014 | Ueda ...................... G06F 19/321 705/3 |
| 2014/0250120 | A1* | 9/2014 | Mei ........................ G06F 3/0488 707/736 |
| 2016/0140435 | A1* | 5/2016 | Bengio .................... G06F 17/28 382/158 |
| 2017/0262433 | A1* | 9/2017 | Chester .................. G06N 7/005 |
| 2017/0278135 | A1 | 9/2017 | Majumdar et al. |
| 2017/0300291 | A1 | 10/2017 | Lee et al. |
| 2018/0137097 | A1 | 5/2018 | Lim et al. |
| 2018/0150444 | A1* | 5/2018 | Kasina .................. G06F 17/241 |
| 2018/0173996 | A1* | 6/2018 | Lim ...................... G06K 9/6293 |
| 2019/0027140 | A1* | 1/2019 | Jeon ........................ G10L 15/22 |
| 2019/0114348 | A1* | 4/2019 | Gao ..................... G06F 16/2343 |

FOREIGN PATENT DOCUMENTS

| | | |
|---|---|---|
| KR | 10-2016-0148260 A | 12/2016 |
| KR | 10-2017-0026274 A | 3/2017 |

OTHER PUBLICATIONS

Jeon et al., "Apparatus and Method for Editing Contents", KR1020170026274, 2016. (Year: 2016).*
Lim et al., "Electronic device and Method for controlling the electronic device thereof", KR20160148260, 2016. (Year: 2016).*
Lim, "Electronic Device and Method for providing Image Associated with Text", KR-10-2016-0175839, 2016. (Year: 2016).*
Li et al., "Video Generation from Text", The Thirty-Second AAAI Conference on Artificial Intelligence, Feb. 2018. (Year: 2018).*
Mansimov et al., "Generating Images From Captions With Attention" ICLR 2016. (Year: 2016).*
Takeshi et al., "Document Preparing Device", JPH1049529, 1998.. (Previously Supplied) (Year: 1998).*
Jeon et al., "Apparatus and Method for Editing Contents", KR1020170026274, 2016.. (Previously Supplied). (Year: 2016).*
Lim et al., "Electronic device and Method for controlling the electronic device thereof", KR20160148260, 2016.. (Previously Supplied). (Year: 2016).*
Lim, "Electronic Device and Method for providing Image Associated with Text", KR-10-2016-0175839, 2016.. (Previously Supplied). (Year: 2016).*
Li et al., "Video Generation from Text", The Thirty-Second AAAI Conference on Artificial Intelligence, Feb. 2018. (Previously Supplied). (Year: 2018).*
Mansimov et al., "Generating Images From Captions With Attention" ICLR 2016.. (Previously Supplied). (Year: 2016).*
International Search Report dated Jul. 1, 2019; International Application#: PCT/KR2019/002853.
Marti et al.; CARDINAL; Computer-Assisted Authoring of Movie Scripts; Session 5B; Intelligent Visualization and Smart Environments; IUI 2018; Intelligent User Interfaces, ACM; pp. 509-519; XP058387362; Mar. 7-11, 2018; Tokyo, JP.
European Search Report dated Oct. 9, 2020; European Appln. No. 19768025.9-1213 / 3698258 PCT/KR2019002853.

* cited by examiner

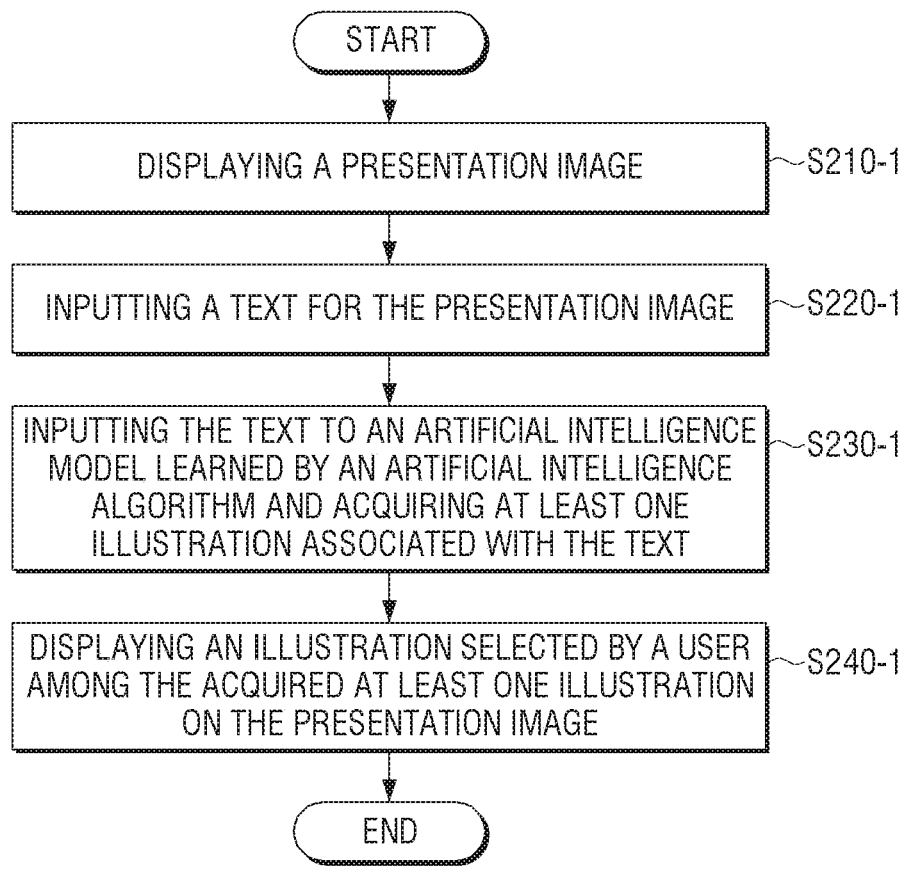

DEGREE, STUDY, COLLEGE, GRADUATION, GRADUATION CEREMONY...  NUCLEAR, ATOM NUCLEAR, SCIENCE, SPACE, RESEARCH...  BRAIN, HUMAN, ARTIFICIAL INTELLIGENCE...

TIME, CLOCK, SCHEDULE...  INCREASE, RISE, UPWARD, RAPID INCREASE, DEVELOPMENT...  ROCKET, SPACE, START-UP, LEAP...

BACKGROUND

PHENOMENON/RESULT

1. PUSH EMOTICON AND INPUT TEXT

2. GENERATE AT LEAST ONE EMOTICON ASSOCIATED WITH INPUT TEXT. SELECT AND SEND GENERATED EMOTICON

3. IT IS POSSIBLE TO GENERATE AND SEND ILLUSTRATION THAT MATCHES NOT ONLY EMOTICON BUT ALSO TEXT

ELECTRONIC APPARATUS AND CONTROLLING METHOD THEREOF

CROSS-REFERENCE TO RELATED APPLICATION(S)

This application is based on and claims priority under 35 U.S.C. § 119 of a Korean patent application number 10-2018-0028603, filed on Mar. 12, 2018, in the Korean Intellectual Property Office, and of a Korean patent application number 10-2019-0023901, filed on Feb. 28, 2019, in the Korean Intellectual Property Office, the disclosure of each of which is incorporated by reference herein in its entirety.

BACKGROUND

1. Field

The disclosure relates to apparatuses and methods consistent with an electronic apparatus and a controlling method thereof. More particularly, the disclosure relates to an electronic apparatus for generating an image associated with text and a controlling method thereof.

2. Description of Related Art

Apparatuses and methods consistent with the disclosure relate to an artificial intelligence (AI) system that mimics functions of a human brain, such as cognition, determination, and the like, using a machine learning algorithm and an application thereof.

In recent years, artificial intelligence systems that implement human-level intelligence have been used in various fields. The artificial intelligence system is a system that a machine itself learns, determines, and becomes smart, unlike an existing rule-based smart system. The more artificial intelligence system is used, the better recognition rate, and the artificial intelligence system may understand a user's taste more accurately, and as a result, the existing rule-based smart system is increasingly being replaced by a deep learning-based artificial intelligence system.

Artificial intelligence technology includes machine learning (e.g., deep learning) and element technologies that utilize the machine learning.

The machine learning is an algorithm technology that classifies/learns the characteristics of input data by itself, and the element technology is a technology that mimics functions such as cognition, determination, and the like of human brain by utilizing machine learning algorithms such as deep learning and the like and includes technical fields such as linguistic understanding, visual understanding, inference and prediction, knowledge representation, motion control, and the like.

Various fields in which the artificial intelligence technology is applied are as follows. The linguistic understanding is a technology for recognizing, applying, and processing human's language/characters, and includes natural language processing, machine translation, dialogue system, query response, voice recognition/synthesis, and the like. The visual understanding is a technology for recognizing and processing objects as human vision, and includes object recognition, object tracking, image search, human recognition, scene understanding, spatial understanding, image enhancement, and like. The inference and prediction is a technology for determining and logically inferring and predicting information, and includes knowledge/probability based inference, optimization prediction, preference based planning, recommendation, and the like. The knowledge representation is a technology that automates the processing of human experience information into knowledge data, and includes knowledge building (data generation/classification), knowledge management (data utilization), and the like. The motion control is a technology for controlling an autonomous running of a vehicle and a motion of a robot, and includes a movement control (navigation, collision, running), an operation control (behavior control), and the like.

Meanwhile, in order to efficiently deliver information, books, newspapers, advertisements, presentations, etc. may be created by inserting illustrations together with text when creating the books, the newspapers, the advertisements, and the presentations. Conventionally, it took a long time to find desired illustrations because it had to find the illustrations suitable for the text one by one, and it was also difficult to unify the designs of the illustrations inserted into one material of the related art.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus for generating an image associated with a text using an artificial intelligence (AI) model, and a controlling method thereof.

Additional aspects will be set forth in part in the description which follows and, in part, will be apparent from the description, or may be learned by practice of the presented embodiments.

In accordance with an aspect of the disclosure, a method of controlling an electronic apparatus is provided. The method includes acquiring a text based on a user input, determining a plurality of key terms from the acquired text, acquiring a plurality of first illustrations corresponding to the plurality of key terms, acquiring a second illustration by synthesizing at least two or more of the first illustrations from among the plurality of first illustrations, and outputting the acquired second illustration.

In accordance with an aspect of the disclosure, an electronic apparatus is provided. The electronic apparatus includes a memory configured to store one or more instructions, and at least one processor coupled to the memory, wherein the at least one processor is configured to execute the one or more instructions to acquire a text based on a user input, determine a plurality of key terms from the acquired text, acquire a plurality of first illustrations corresponding to the plurality of key terms, acquire a second illustration by synthesizing at least two or more of the first illustrations from among the plurality of first illustrations, and output the acquired second illustration.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWING FIGURES

The above and other aspects, features, and advantages of certain embodiments of the disclosure will be more apparent from the following description taken in conjunction with the accompanying drawings, in which:

FIG. 2B is a flow chart for describing a controlling method of an electronic apparatus according to an embodiment of the disclosure;

Figure 9:
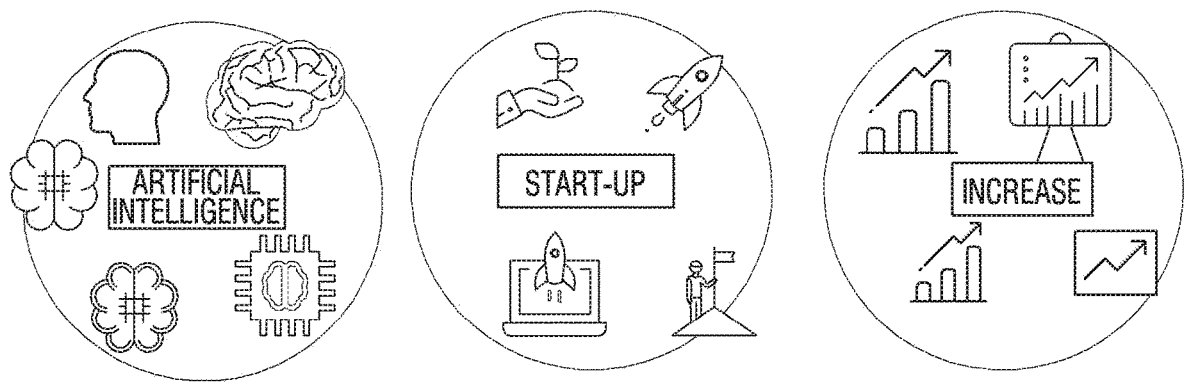
Figure 10:
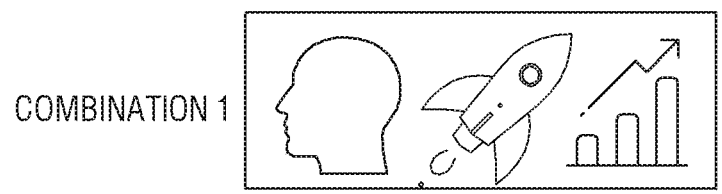
Figure 10:
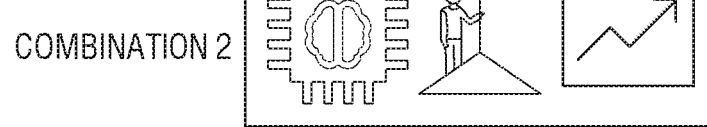
Figure 11:
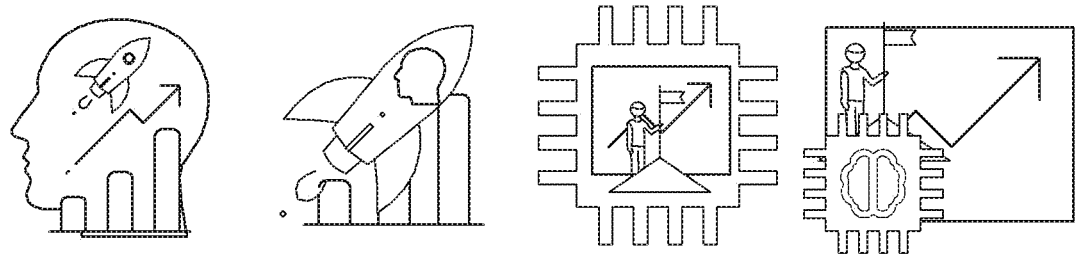
Figure 12:
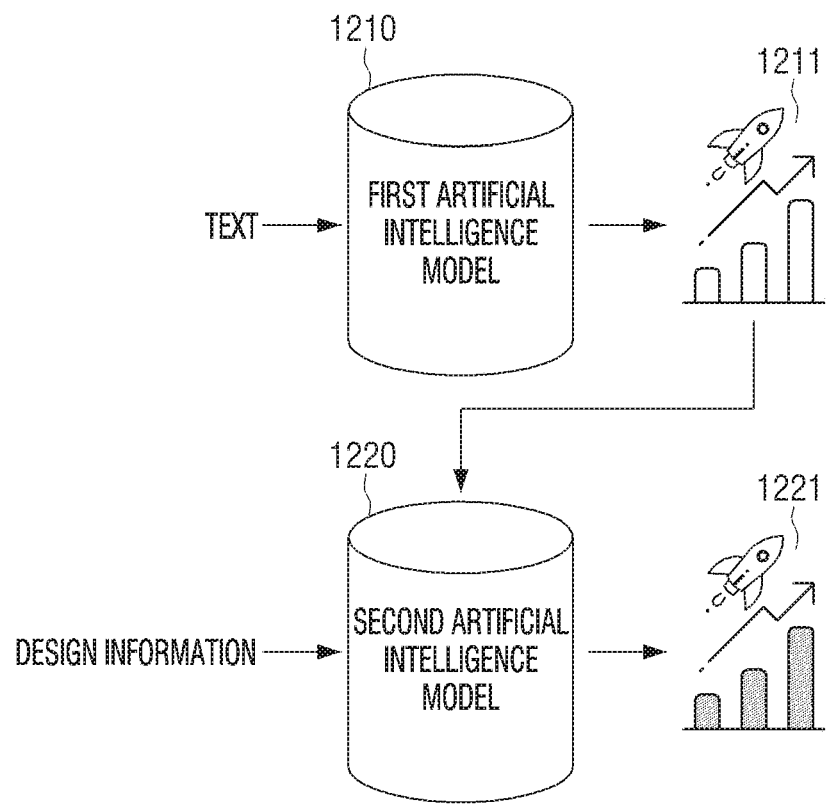
Figure 17:
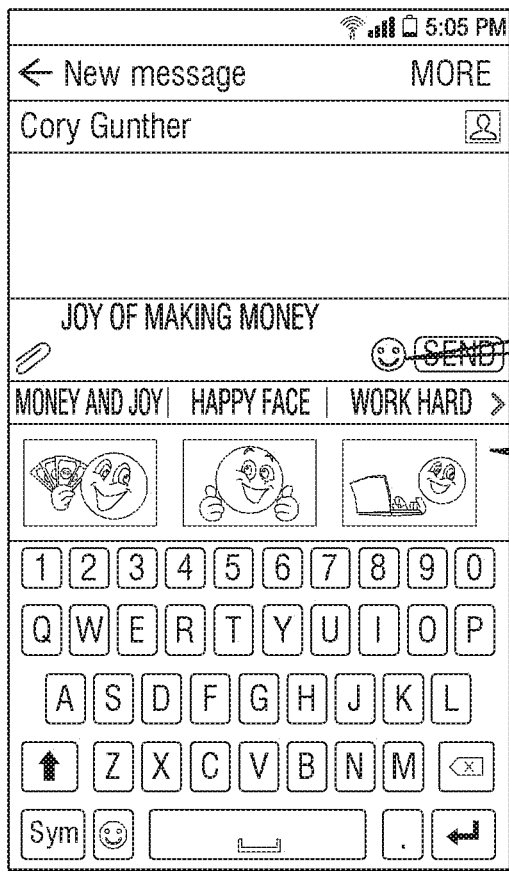
Figure 17:
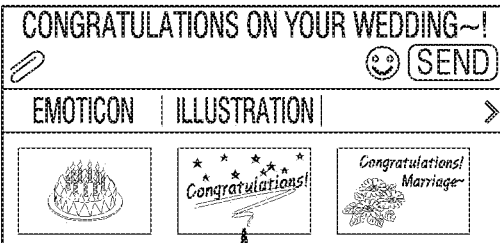
Figure 18A:
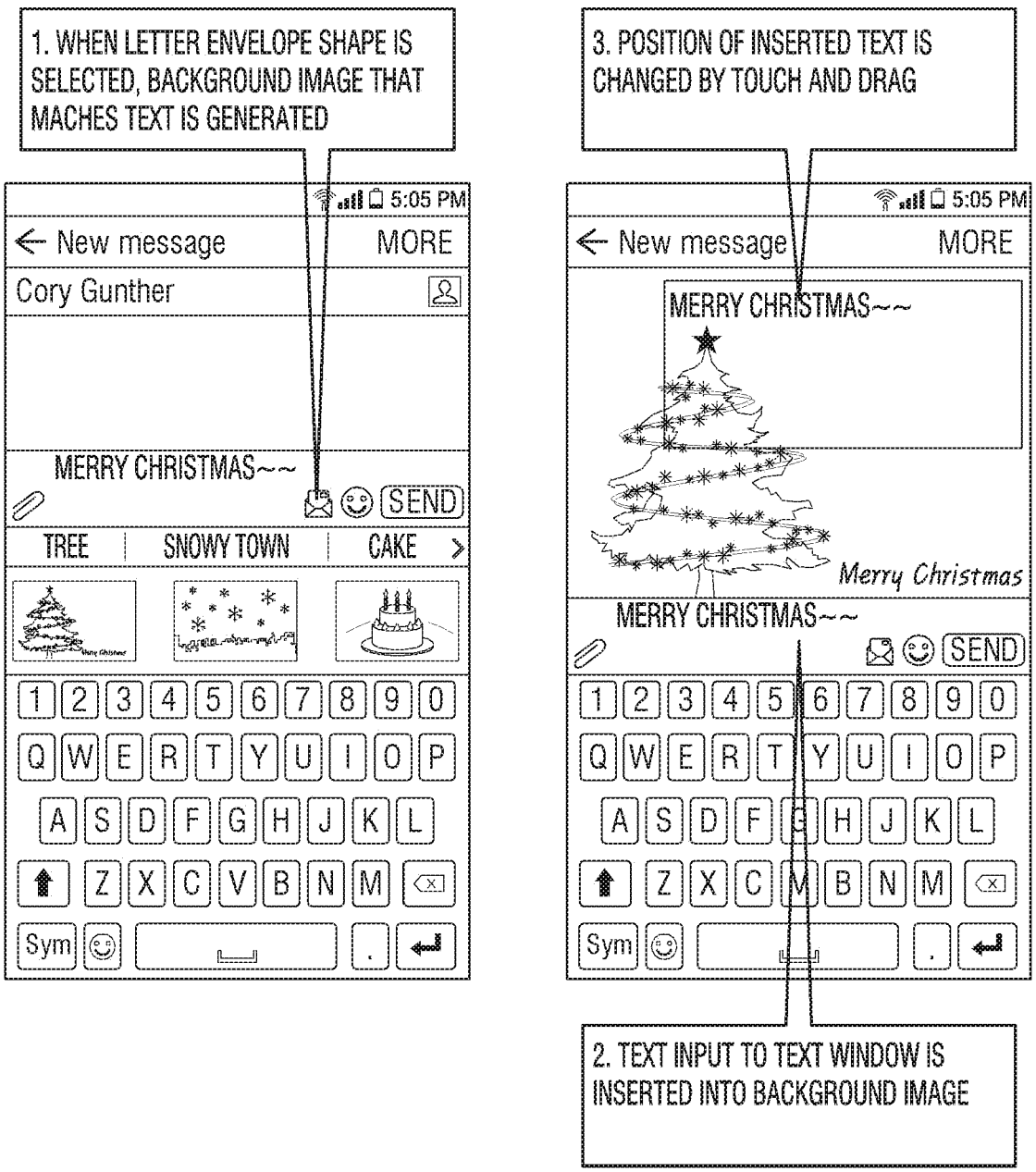
Figure 18B:
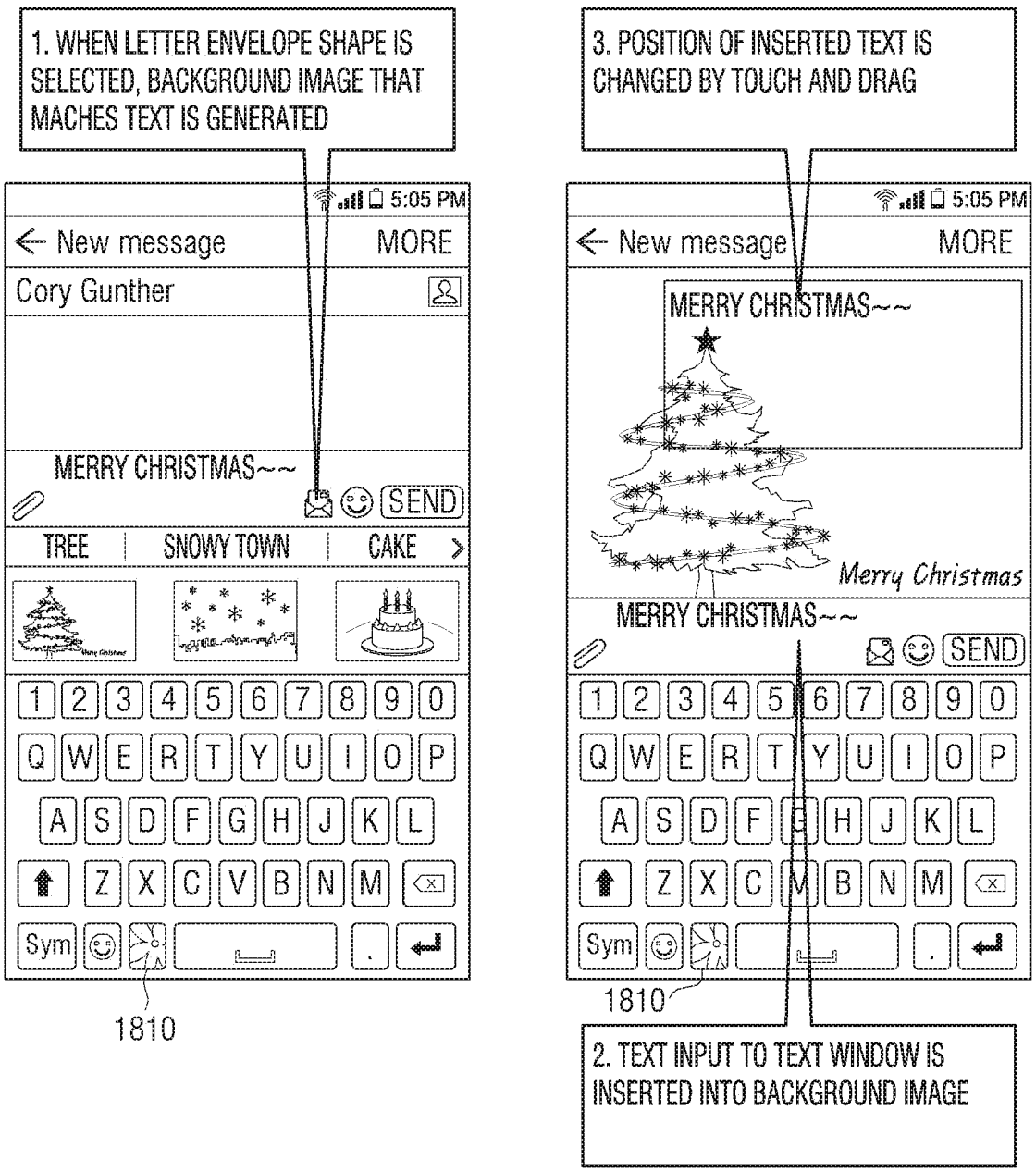
Figure 19:
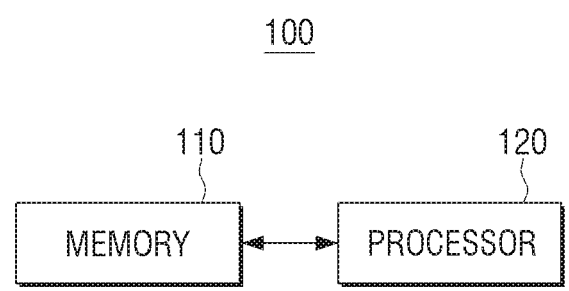
Figure 20A:
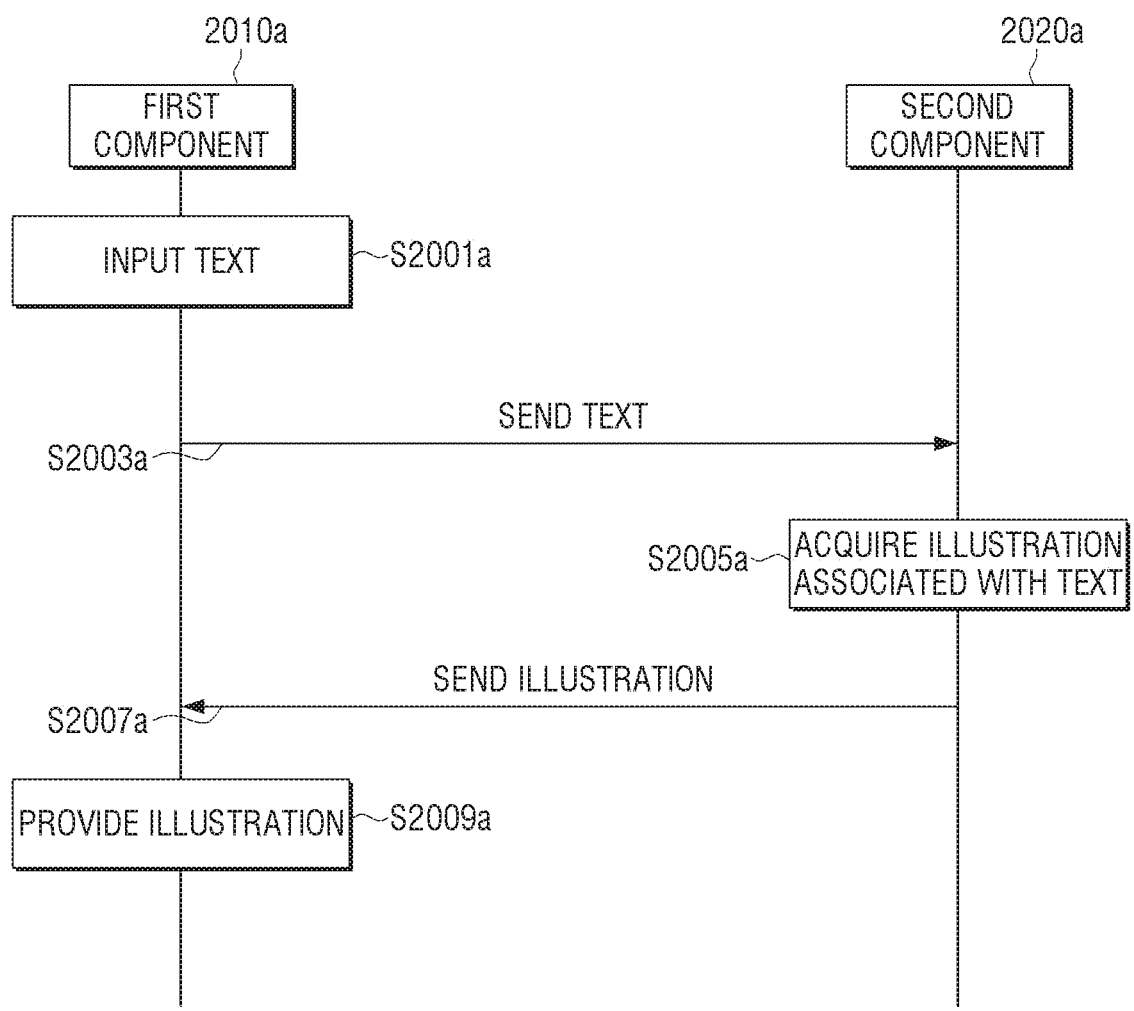
Figure 20B:
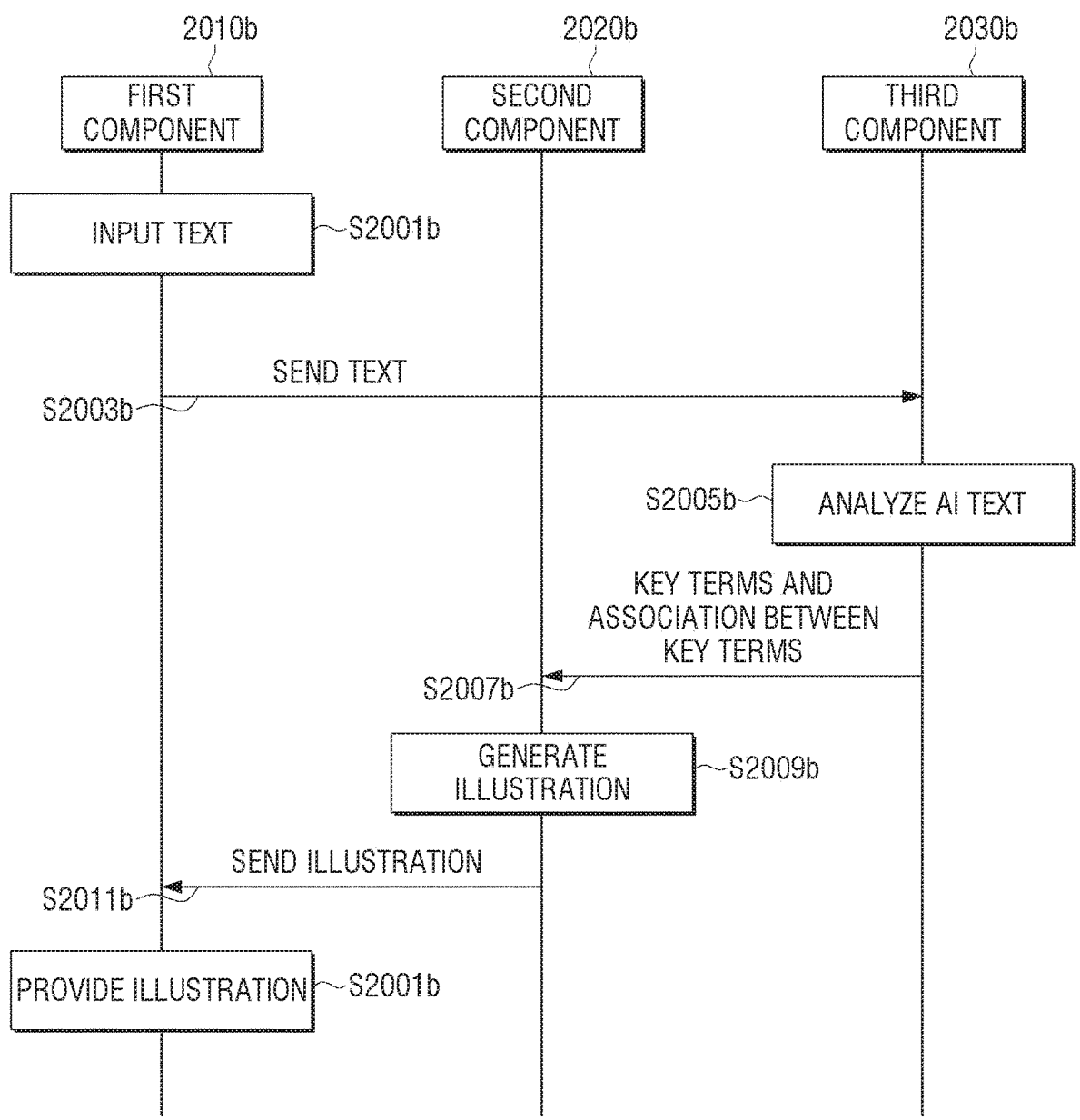
Figure 20C:
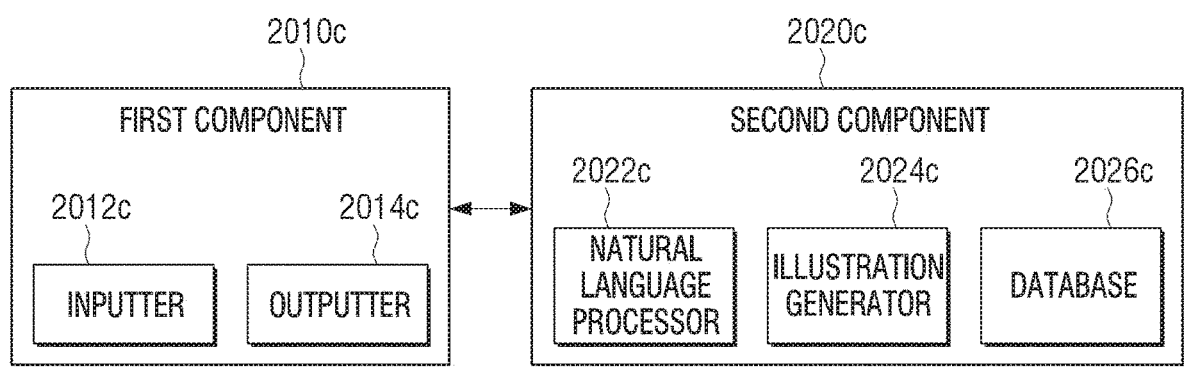
Figure 21:
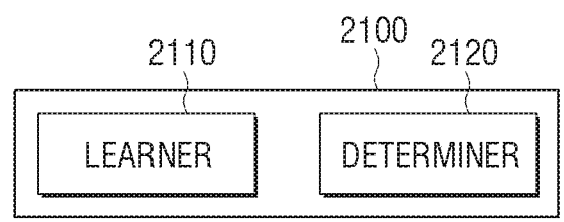
Figure 22:
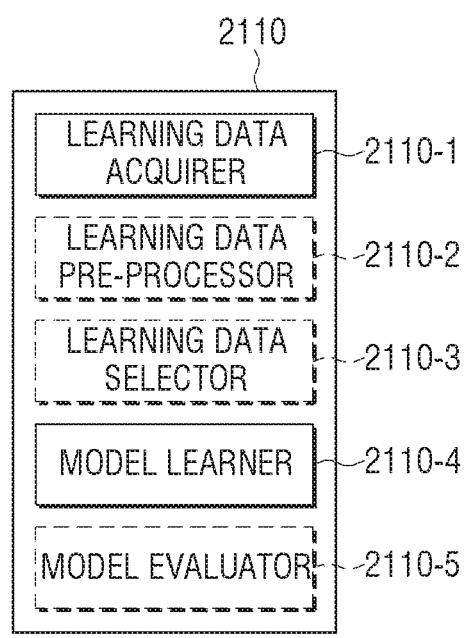
Figure 23:
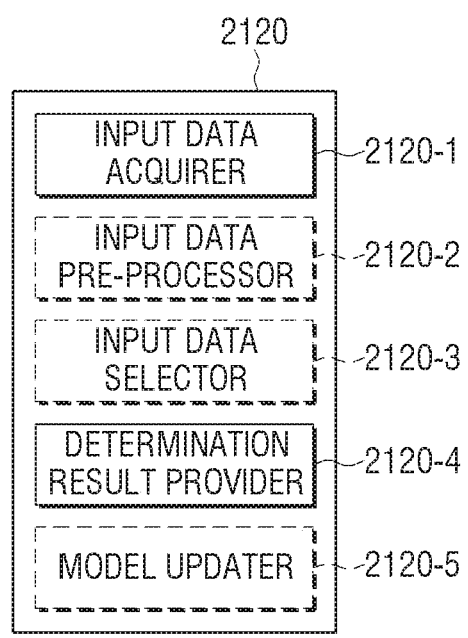

FIGS. 5, 6, 7, and 8 are diagrams for describing an embodiment of the disclosure of acquiring a synthesized illustration in which a plurality of illustrations are synthesized according to various embodiments of the disclosure;

FIGS. 9, 10, and 11 are diagrams for describing an embodiment of the disclosure of providing a plurality of synthesized illustrations which are synthesized in various combinations according to various embodiments of the disclosure;

FIG. 12 is a diagram for describing an embodiment of the disclosure of acquiring an illustration associated with a text and corresponding to a design of a presentation image according to an embodiment of the disclosure;

FIGS. 13, 14, 15, and 16 are diagrams for describing a user interface for providing illustrations according to diverse embodiments of the disclosure;

FIGS. 17 and 18A are diagrams for describing diverse embodiments of the disclosure in which an illustration generation function is applied to a messenger program according to various embodiments of the disclosure;

FIG. 18B is a diagram for describing an embodiment of the disclosure in which the illustration generation function is applied to a keyboard program according to an embodiment of the disclosure;

FIG. 19 is a block diagram for describing a configuration of an electronic apparatus according to an embodiment of the disclosure;

FIG. 20A is a flow chart of a network system using a recognition model according to various embodiments of the disclosure;

FIG. 20B is a flow chart of a network system using an artificial intelligence model according to an embodiment of the disclosure;

FIG. 20C is a configuration diagram of a network system according to an embodiment of the disclosure;

FIG. 21 is a block diagram for describing an electronic apparatus for learning and using a recognition model according to an embodiment of the disclosure; and FIGS. 22 and 23 are block diagrams for describing a learner and an analyzer according to various embodiments of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

A term "module", "unit" "part", or the like, used in the disclosure is a term for referring to the component performing at least one function or operation, and such a component may be implemented in hardware or software or may be implemented in a combination of hardware and software. In addition, a plurality of "modules", "units", "parts", or the like may be integrated into at least one module or chip and may be implemented in at least one processor, except for a case in which they need to be each implemented in individual specific hardware.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

Terms used in the disclosure may be used only to describe specific embodiments rather than restricting the scope of other embodiments. Terms used in the specification including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

An electronic apparatus according to diverse embodiments of the disclosure may include at least one of, for example, a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an moving picture experts group phase 1 or phase 2 (MPEG-1 or MPEG-2) audio layer-3 (MP3) player, a mobile medical device, a camera, or a wearable device. According to diverse embodiment, the wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), or a living body implantation type wearable device (for example, an implantable circuit).

In some embodiments, the electronic apparatus may be a home appliance. The home appliance may include at least one of, for example, a television (TV), a digital video disc (DVD) player, an audio, a refrigerator, an air conditioner, a cleaner, an oven, a microwave oven, a washing machine, an air cleaner, a set-top box, a home automation control panel, a security control panel, a TV box (for example, HomeSync™ of Samsung Electronics Co., Ltd, TV™ of Apple Inc, or TV™ of Google), a game console (for example Xbox™, PlayStation™), an electronic dictionary, an electronic key, a camcorder, or a digital photo frame.

In other embodiments, the electronic apparatus may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, an automatic teller's machine of a financial institute, a point of sales (POS) of a shop, or Internet of things (IoT) devices (for example, a light bulb, various sensors, an electric or gas meter, a sprinkler system, a fire alarm, a thermostat, a street light, a toaster, an exercise equipment, a hot water tank, a heater, a boiler, and the like).

According to some embodiments, the electronic apparatus may include at least one of a portion of a furniture or a building/structure, an electronic board, an electronic signature receiving device, a projector, or various meters (for example, water, electricity, gas, electric wave meter, or the like). In diverse embodiments, the electronic apparatus may be one or one or more combinations of the various apparatuses described above. An electronic apparatus according to some embodiments may be a flexible electronic apparatus. In addition, the electronic apparatus according to the embodiments of the disclosure is not limited to the apparatuses described above, but may include new electronic apparatuses in accordance with the development of technologies.

Hereinafter, the disclosure will be described in detail with reference to the accompanying drawings.

Figure 1:
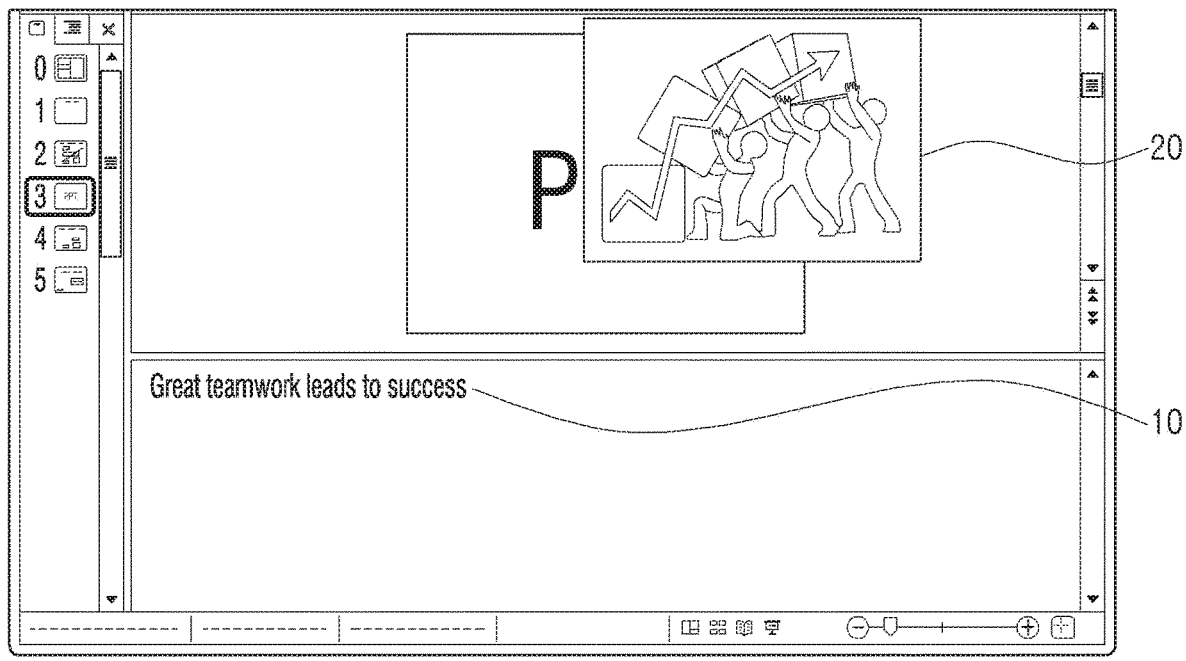
FIG. 1 is a diagram for describing an illustration providing method according to an embodiment of the disclosure.

FIG. 1 is a diagram for describing an illustration providing method according to an embodiment of the disclosure.

Referring to FIG. 1, if a user enters a text 10, which is a presentation script, through a presentation program such as Microsoft PowerPoint™, an illustration 20 corresponding to the text 10 may be provided. According to the disclosure, a meaning of the text 10 may be detected using an artificial intelligence technology and the illustration 20 that matches the meaning of the text 10 may be provided.

Such an illustration providing function may be provided as a plugin or an additional function (add-in and an add-on) to presentation software such as Microsoft PowerPoint™, KeyNote™, or the like, or may also be provided as separate software.

The illustration providing function according to the disclosure may be applied not only to presentation materials but also to any field utilizing images suitable for texts such as books, newspapers, advertisements, magazines, electronic postcards, emails, instant messengers and the like.

The term "illustration" used in the disclosure may also be referred to as the term such as a pictogram, a flaticon, an international system of typographic picture education (ISOTYPE), an infographic, an image (video or still image), a picture, an emoticon, or the like.

The illustrations used in the disclosure may be directly created by a subject providing the service, or may be an externally collected illustration. In the case of the externally collected illustration, the subject providing the service should collect only illustrations in which a copyright issue is solved and utilize the illustrations to the service. If illustrations including copyright are used to provide better quality illustrations, the subject providing the service should solve the copyright issue. In addition, in order to provide the service, an additional charge may be received from the user.

The illustration providing function according to diverse embodiments of the disclosure may be implemented through an electronic apparatus. Hereinafter, a controlling method of an electronic apparatus according to an embodiment of the disclosure will be described with reference to FIGS. 2A and 2B.

Figure 2A:
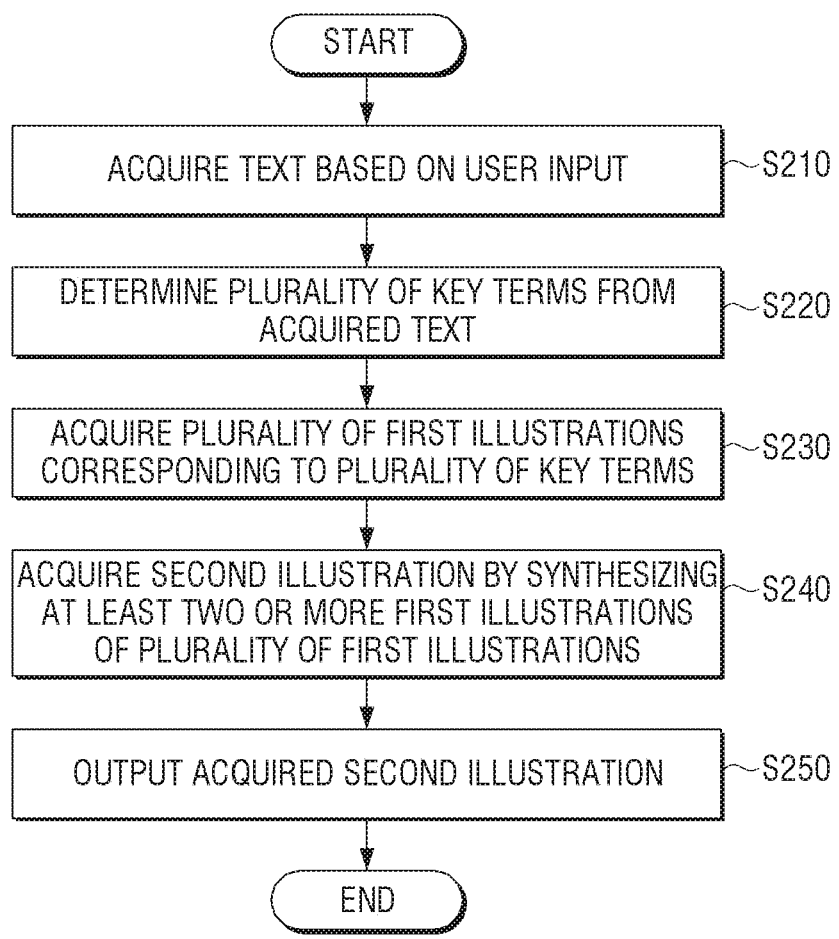
FIG. 2A is a flow chart for describing a controlling method of an electronic apparatus according to an embodiment of the disclosure.

FIGS. 2A and 2B are flow charts for describing a controlling method of an electronic apparatus according to an embodiment of the disclosure.

Referring to FIG. 2A, the electronic apparatus according to an embodiment of the disclosure acquires a text based on a user input at operation S210. Specifically, the electronic apparatus may provide a presentation image, receive a text for the presentation image, and acquire the text for the presentation image based on the user input.

Here, the presentation image may be a screen provided by executing presentation software, for example, a screen as illustrated in FIG. 1. The presentation image may be displayed through a display embedded in the electronic apparatus, or may be displayed through an external display device connected to the electronic apparatus. In addition, the text for the presentation image may also be referred to as a script, an announcement, or the like.

For example, as illustrated in FIG. 1, the text 10 may be input to a text input window provided on the screen on which the presentation image is displayed. The electronic apparatus may receive the text for the presentation image through an input device. The input device may include, for example, a keyboard, a touchpad, a mouse, a button, or the like. The input device may be an external input device embedded in the electronic apparatus or connected to the electronic apparatus.

Meanwhile, the user input may be a voice input according to an utterance of a user. Specifically, the electronic apparatus may acquire utterance information of the user by receiving the voice input of the user and analyzing the received voice input, and acquire a text corresponding to the acquired utterance information of the user.

When the text is acquired, the electronic apparatus determines (or identifies) a plurality of key terms (or key words) from the acquired text at operation S220. In addition, if the plurality of key terms is determined, the electronic apparatus acquires a plurality of first illustrations corresponding to the plurality of key terms at operation S230.

Specifically, the electronic apparatus may input information and text for a design of a presentation image to a first artificial intelligence model learned by an artificial intelligence algorithm to thereby acquire a plurality of first illustrations associated with the text and corresponding to the design of the presentation image. For example, referring to FIG. 1, a text 10 "Great teamwork leads to success" may be input to the artificial intelligence model learned by the artificial intelligence algorithm to thereby acquire an illustration 20 associated with the text 10.

Figure 3:
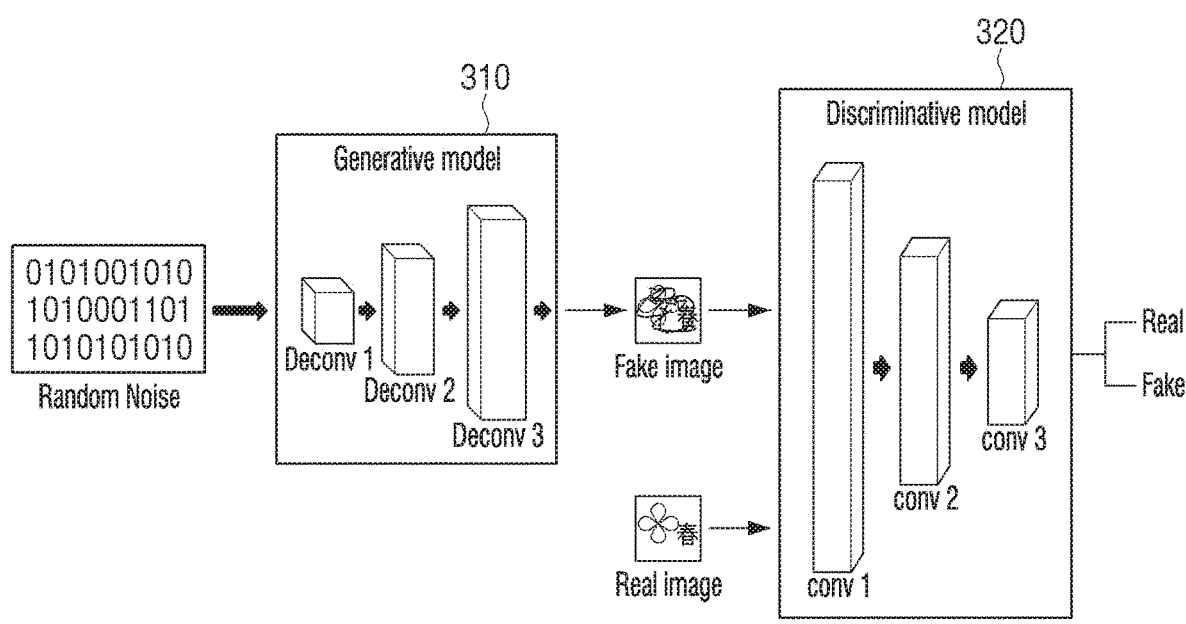
FIG. 3 is a diagram illustrating an example of a learning method through a generative adversarial network (GAN) according to an embodiment of the disclosure.

Meanwhile, according to an embodiment of the disclosure, the artificial intelligence model may be learned by a generative adversarial network (GAN). A GAN technology is a key concept in which a generative model and a discriminative model are opposed to each other and performances of each other are gradually improved. FIG. 3 illustrates an example of a learning method through the GAN.

FIG. 3 is a diagram illustrating an example of a learning method through a generative adversarial network (GAN) according to an embodiment of the disclosure.

Referring to FIG. 3, the generative model 310 generates any image (fake image) from random noise, and the discriminative model 320 discriminates a real image (or learned data) and the fake image generated by the generative model from each other. The generative model 310 is learned in a direction that the discriminative model 320 is gradually unable to discriminate between the real image and the fake image, and on the other hand, the discriminative model 320 is learned in a direction that better discriminates between the real image and the fake image. As the learning progresses, the generative model 310 may generate the fake image that is substantially similar to the real image. The generative model 310 learned as described above may be utilized as the artificial intelligence model at operation S230.

According to another embodiment of the disclosure, at operation S230, at least one key work may be acquired from the text using the artificial intelligence model, and an illustration corresponding to at least one acquired key term may be searched from a pre-stored database. For example, an artificial intelligence model for natural language processing may be provided, and such an artificial intelligence model may be used to perform morphological analysis, key term extraction, detection of meaning and association of keywords (e.g., detection of homonyms, background words, key terms, etc.).

Figure 4:
FIG. 4 is a diagram for describing an illustration search method according to an embodiment of the disclosure using a database including illustrations matched with tag information according to an embodiment of the disclosure.
Figure 4:
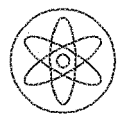
Figure 4:
Figure 4:
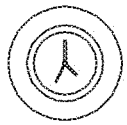
Figure 4:
Figure 4:

FIG. 4 is a diagram for describing an illustration search method according to an embodiment of the disclosure using a database including illustrations matched with tag information according to an embodiment of the disclosure.

Referring to FIG. 4, a database in which illustrations matched to tag information may be provided. In this case, for example, if a text "in recent years, due to a breakthrough of artificial intelligence technology, start-up advance related to artificial intelligence is increased" is input, the text may be entered into an artificial intelligence model for natural-language processing (NLP) to acquire 'artificial intelligence', 'start-up', and 'increase' as the key terms, and the illustrations matched to tag information including the key terms may be searched from the database.

According to an embodiment of the disclosure, when an entire sentence is input, the sentence may be divided into phrases/paragraphs to sequentially generate and provide illustrations corresponding to the phrases/paragraphs having main meanings of the entire sentence.

Meanwhile, the electronic apparatus may input the text to the first artificial intelligence model to acquire a plurality of first illustrations associated with the text and having the same graphic effect as each other.

If the plurality of first illustrations are acquired, the electronic apparatus acquires a second illustration by synthesizing at least two or more first illustrations of the plurality of first illustrations at operation S240. Specifically, the electronic apparatus may input the information on the design of the presentation image and the plurality of first illustrations to the learned second artificial intelligence model to thereby acquire and output a second illustration modified so that at least two or more of the plurality of first illustrations correspond to the design of the presentation image. In other words, according to another embodiment of the disclosure, the electronic apparatus may input the text to the artificial intelligence model to thereby acquire the plurality of first illustrations and to acquire the second illustration in which the plurality of first illustrations are synthesized as an illustration associated with the text. That is, a synthesized illustration in which several illustrations are synthesized may be provided.

For example, by using the artificial intelligence model, the electronic apparatus may determine the plurality of key terms from the text, acquire the plurality of first illustrations corresponding to the plurality of key terms, and acquire the synthesized second illustration by disposing the plurality of first illustrations according to context of the plurality of key terms.

Meanwhile, the electronic apparatus may acquire the second illustration by disposing and synthesizing the plurality of first illustrations according to the context of the plurality of key terms.

When the second illustration is acquired according to the above-described processes, the electronic apparatus outputs the acquired second illustration at operation S250. Specifically, when the second illustration is acquired, the electronic apparatus may control the display to display the acquired second illustration and output the acquired second illustration through the display.

Meanwhile, as described above, the electronic apparatus may acquire a text based on a user input in a state in which a presentation image is not displayed. However, the electronic apparatus may also display a presentation image, and acquire a text for the presentation image. Hereinafter, an embodiment of acquiring a text for a presentation image, and acquiring an illustration based on the acquired text will be described again, with reference to FIG. 2B. Meanwhile, as detailed descriptions of each step have already been made with reference to FIG. 2A, overlapping descriptions will be omitted.

Referring to FIG. 2B, first, a presentation image is displayed at operation S210-1. A presentation image is an image that is provided by executing presentation software, and for example, it may be a screen as illustrated in FIG. 1.

When a presentation image is displayed, the electronic apparatus receives an input of a text for the presentation image at operation S220-1. For example, as illustrated in FIG. 1, the electronic apparatus may receive an input of a text 10 on a text input window provided on a screen displaying the presentation image.

When a text for the presentation image is input, the electronic apparatus acquires at least one illustration associated with the text by inputting the text to an artificial intelligence model learned by an artificial intelligence algorithm at operation S230-1. For example, referring to FIG. 1, a text 10 "Great teamwork leads to success" may be input to the artificial intelligence model learned by the artificial intelligence algorithm to thereby acquire an illustration 20 associated with the text 10.

When at least one illustration associated with the text is acquired, the electronic apparatus displays an illustration selected by a user among the acquired at least one illustration on the presentation image at operation S240-1.

FIGS. 5 to 8 are diagrams for describing an embodiment of the disclosure of acquiring a synthesized illustration in which a plurality of illustrations are synthesized according to an embodiment of the disclosure.

Figure 5:
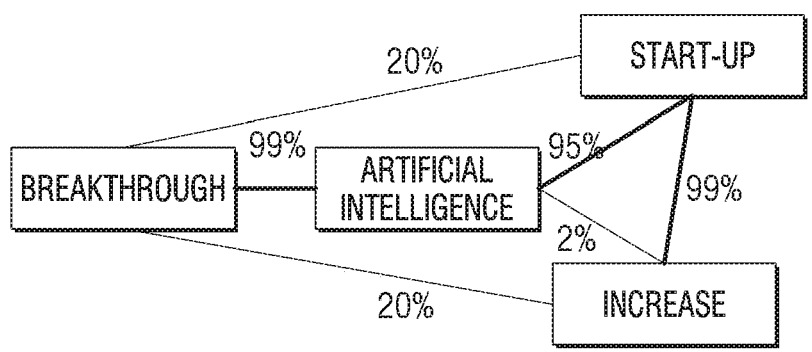
Figure 6:
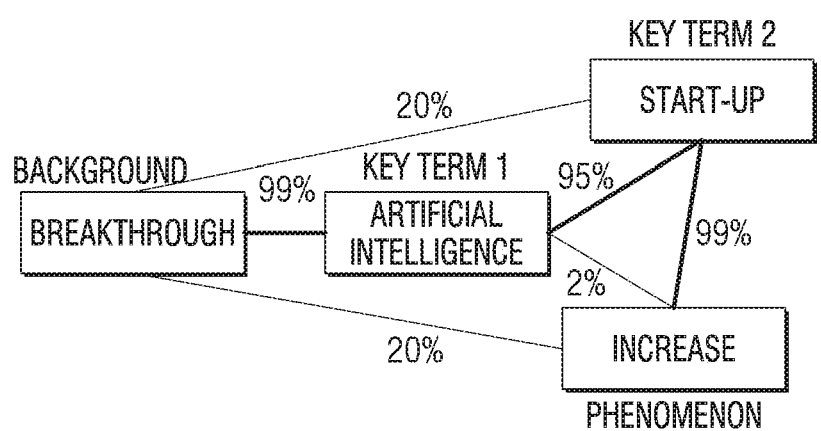
Figure 7:
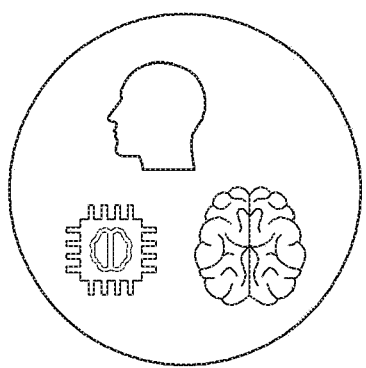
Figure 7:
Figure 8:
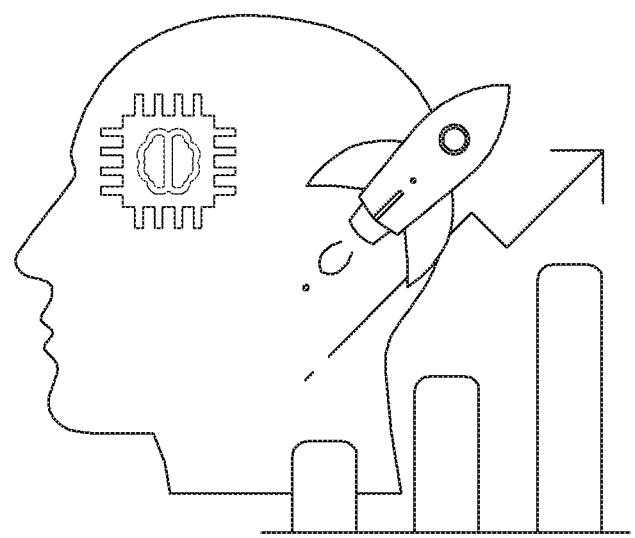

FIG. 5 is a diagram for describing an embodiment of acquiring a synthesized illustration in which a plurality of illustrations are synthesized, FIG. 6 is a diagram for describing an embodiment of acquiring a synthesized illustration in which a plurality of illustrations are synthesized, FIG. 7 is a diagram for describing an embodiment of acquiring a synthesized illustration in which a plurality of illustrations are synthesized, and FIG. 8 is a diagram for describing an embodiment of acquiring a synthesized illustration in which a plurality of illustrations are synthesized.

Referring to FIG. 5, for example, if a text "in recent years, due to a breakthrough of artificial intelligence technology, start-up advance related to artificial intelligence is increased" is input, the artificial intelligence model may be used to acquire "artificial intelligence", "start-up", "breakthrough", and "increase" as the key terms and determine association between these key terms. The association may be calculated as a numerical vale (percent) of the degree of association of the respective words.

Referring to FIG. 6, a context of the acquired key terms may be determined. A process of determining a context includes a process of determining a role of each key term in the sentence, for example, whether each key term is a word corresponding to a background, a word corresponding to a phenomenon/result, or a word corresponding to a center of the sentence.

Referring to FIG. 7, a plurality of illustrations corresponding to the acquired key terms may be acquired. The plurality of illustrations may be classified according to the association and the context of the key terms. For example, at least one illustration corresponding to the key terms corresponding to the background and at least one illustration corresponding to the key terms corresponding to the phenomenon/result may be classified.

Referring to FIG. 8, the plurality of illustrations may be disposed and synthesized according to the association and the context of the key terms. For example, the illustration corresponding to the background word may be disposed behind other illustrations and may be set to have higher transparency than other illustrations. In addition, the illustrations corresponding to the center word and the word representing the phenomenon/result may be set to have lower transparency than other illustrations, and may be expressed by a thick line. The user may use the synthesized illustration as it is as illustrated in FIG. 8, or may also generate a new synthesized illustration by separately modifying the plurality of illustrations in the synthesized illustration as desired (modifying sizes, graphic effects, layout positions, and the like).

FIGS. 9 to 11 are diagrams for describing an embodiment of the disclosure of providing a plurality of synthesized illustrations which are synthesized in according to various embodiment of the disclosure.

According to an embodiment of the disclosure, a plurality of synthesized illustrations synthesized in various combinations may be provided. The embodiment will be described with reference to FIGS. 9 to 11.

Referring to FIG. 9, for example, if a text "in recent years, due to a breakthrough of artificial intelligence technology, start-up advance related to artificial intelligence is increased" is input, the key terms may be extracted using the artificial intelligence model, and the plurality of illustrations corresponding to each key term may be acquired. For example, as illustrated in FIG. 9, the illustrations corresponding to the key term "artificial intelligence", the illustrations corresponding to the key term "start-up", and the illustrations corresponding to the key term "increase" may be acquired, respectively. In addition, referring to FIG. 10, the illustrations of each key term may be configured in various combinations. In this case, using the artificial intelligence model, various combinations may be provided in consideration of similarity of the type of illustration and the type of the presentation image, the similarity between the illustrations, and the like. In addition, referring to FIG. 11, various synthesized illustrations may be provided in a form of a recommendation list by disposing and synthesizing the illustrations of each combination based on the context of the key terms. In this case, a first database constituted by templates for a layout of the illustrations defined according to the type of association between the words, and a second database constituted by templates for a layout of the illustrations defined according to the type of association between phrases/paragraphs may be used. The illustrations may be disposed by loading the templates from the databases.

The user may select and use a desired synthesized illustration from the recommendation list. Alternatively, the user may also generate a new synthesized illustration by separately modifying the plurality of illustrations in the synthesized illustration as desired (modifying sizes, graphic effects, layout positions, and the like) instead of using the provided synthesized illustration as it is. A weight may be assigned to the synthesize illustration selected by the user, that is, the combination selected by the user, and the artificial intelligence model may be re-learned using the weight. That is, reinforcement learning technology may be used.

According to an embodiment of the disclosure, the information on the design of the presentation image and the text may be input to the artificial intelligence model to thereby acquire at least one illustration associated with the text and corresponding to the design of the presentation image. The information on the design of the presentation image may include information such as themes, background styles, colors, fonts, graphic effects, brightness, contrast, transparency, and the like of the presentation image, or a capture screen of an entirety of a current presentation image.

In this case, the artificial intelligence model may include a first artificial intelligence model that generates a basic form of the illustration and a second artificial intelligence model that modifies the illustration of the basic form to correspond to the design of the presentation image. The basic form of the illustration may include color, a form to which a design effect is not applied, a line-only picture, a black-and-white picture, and the like. This will be described with reference to FIG. 12.

FIG. 12 is a diagram for describing an embodiment of the disclosure of acquiring an illustration associated with a text and corresponding to a design of a presentation image according to an embodiment of the disclosure.

Referring to FIG. 12, a first artificial intelligence model 1210 is a model that generates the illustration corresponding to the text, and is a model learned using the text and the image as learning data. A second artificial intelligence model 1220 is a model that modifies the image to correspond to the design of the presentation image, and is a model learned using the information on the presentation image and the text as the learning data. The information on the design of the presentation image may be information on themes, background styles, colors, fonts, graphic effects, brightness, contrast, transparency, and the like of the presentation image.

The second artificial intelligence model 1220 may modify an input image according to the design of the presentation image in relation to the theme, line style, line thickness, color, size, graphic effect, brightness, contrast, shape, layout, synthesis, and the like of the input image. For example, the second artificial intelligence model 1220 may list colors used in the design of the presentation image, calculate color theme information of the presentation image by using frequency, area, and the like of the colors as a weight, and color the illustration using the colors in the calculated color theme. Alternatively, the second artificial intelligence model 1220 may define the style of the presentation image from design elements such as a line style, a line thickness, a curve frequency, an edge processing, and the like used in the design of the presentation image in addition to the color information, and may change the graphic effect of the illustration using the information.

The second artificial intelligence model may give dynamic motion or give sound effects to the illustration. There may be a movement in a certain part of the illustration, such as rotation, blinking, shaking, repetition of increasing or decreasing over a certain size, or the like, and at the time of appearance of the illustration, an effect sound or a short music that suitably matches the illustration may be provided together with the illustration.

According to an embodiment, at least one first illustration 1211 may be acquired by inputting the text for the presentation image to the first artificial intelligence model 1210. Because the first artificial intelligence model 1210 may perform the natural-language processing, the first artificial intelligence model 1210 may extract the key terms from the text and detect the meaning and the association of each key term. The form of the first illustration 1211 may be generated according to the meaning of the key term, the first illustration 1211 may be formed by disposing and synthesizing the plurality of illustrations according to the association between the key terms and the meaning of the context, and the size, position, transparency, and the like of the plurality of illustrations may be determined according to the importance of the key terms (according to whether the keyword is a background word, a main word, or a sub-word).

In addition, at least one second illustration 1221 that at least one first illustration 1211 is modified to correspond to the design of the presentation image may be acquired by inputting the information on the design of the presentation image and at least one first illustration 1211 to the second artificial intelligence model 1220.

Because the design of the presentation image may be different for each slide, illustrations matched to a design of a current slide may be generated.

According to another embodiment, even though there is no information on the design of the presentation image, a design of a new illustration may be determined to be matched to a design of an existing generated illustration.

According to an embodiment of the disclosure, when the design is changed by the user editing the design of an overall presentation image after the illustration acquired using the artificial intelligence model is applied to the presentation image, the graphic effect of the illustration may be automatically changed to be matched to the changed design. As another example, when the graphic effect of any one of the illustrations applied to the presentation image is changed by the user, graphic effects of other illustrations may be automatically changed in the same manner as the modified graphic effect.

According to the embodiment described above, because the illustrations matching with the design of the presentation image and having a sense of unity may be acquired, the user may create the presentation materials having higher completion in a sense of design.

Meanwhile, it is also important to match the illustration with the design of the presentation image, but the illustrations also need to match each other. According to another embodiment of the disclosure, the illustrations may be generated so that the designs between the illustrations are similar to each other. For example, the plurality of illustrations associated with the text and having the same graphic effect as each other may be acquired by inputting the text for the presentation image to the artificial intelligence model.

The graphic effect may include a shadow effect, a reflection effect, a neon sign effect, a stereoscopic effect, a three-dimensional rotation effect, and the like.

In this case, designs between illustrations acquired from one sentence/one paragraph and a sentence/paragraph designated by the user may be generated similar to each other, or designs between the entire illustrations of the same presentation material may be generated similar to each other.

Referring once again to FIG. 2, the illustration selected by the user among one or more illustrations acquired according to the diverse embodiments described above is displayed on the presentation image at operation S240.

For example, at least one illustration acquired according to the embodiments described above may be provided in some area in the screen on which the presentation image is displayed, and here, the selected illustration may be displayed on the presentation image. As another example, the acquired illustration may be displayed on the presentation image without the selection of the user.

The illustration displayed on the presentation image may be edited by an additional user operation.

Figure 13:
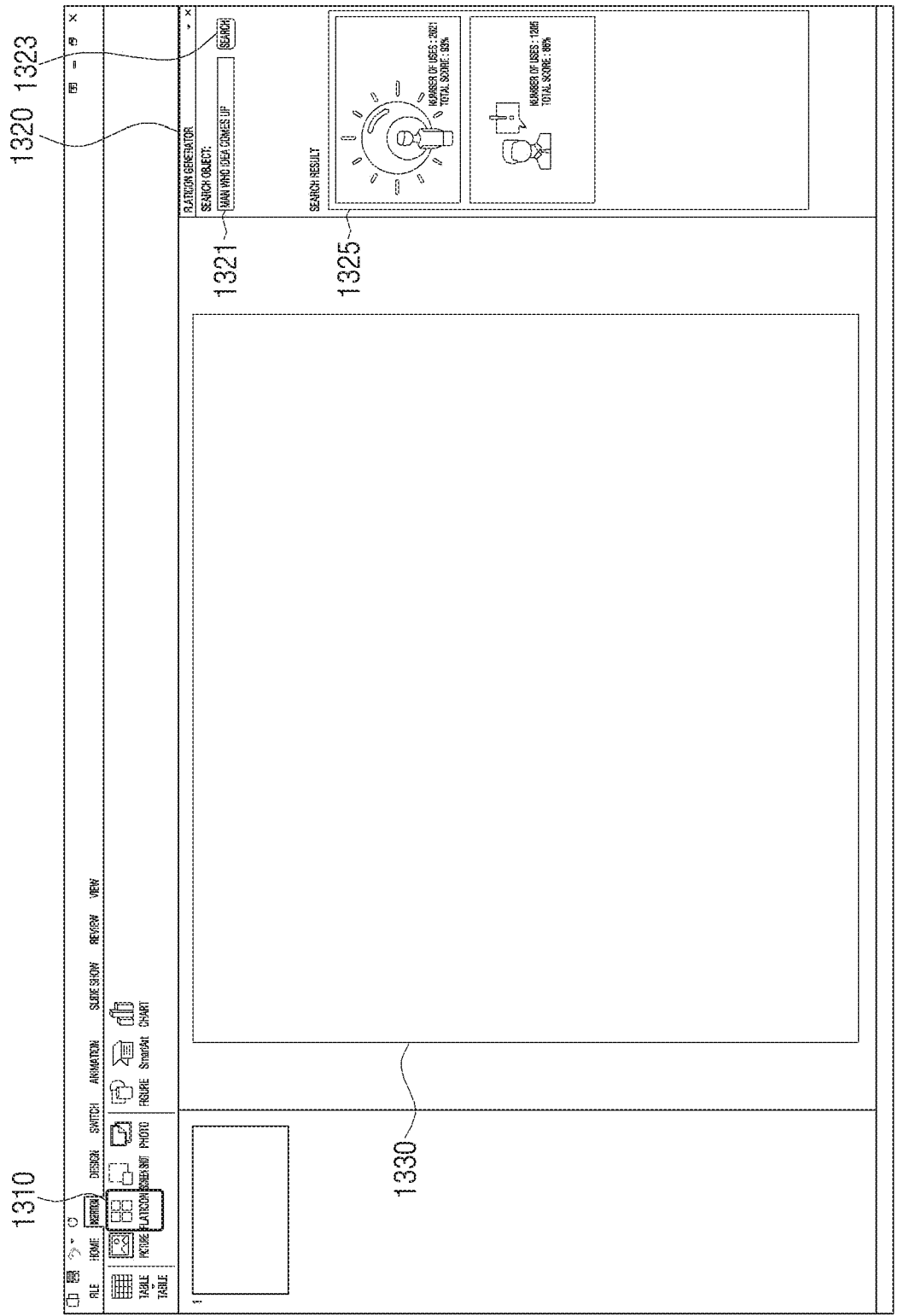
Figure 14:
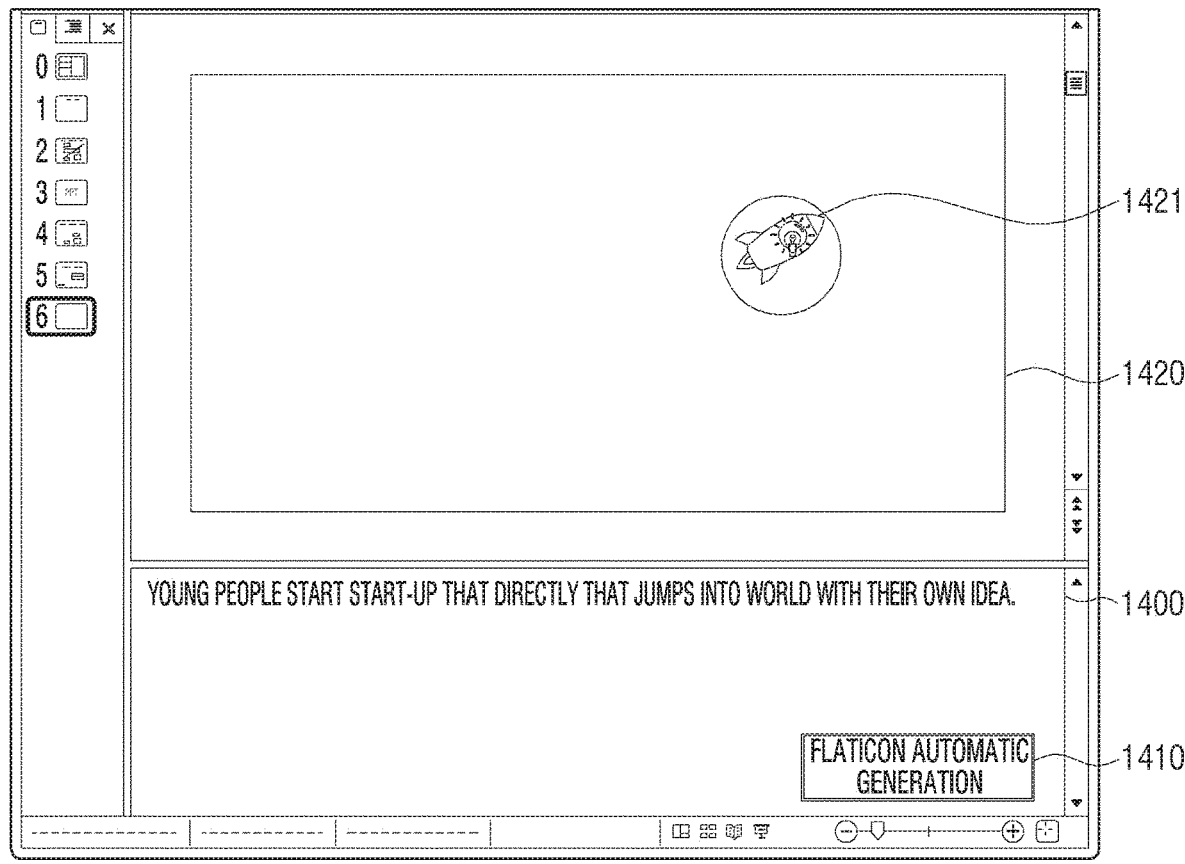
Figure 15:
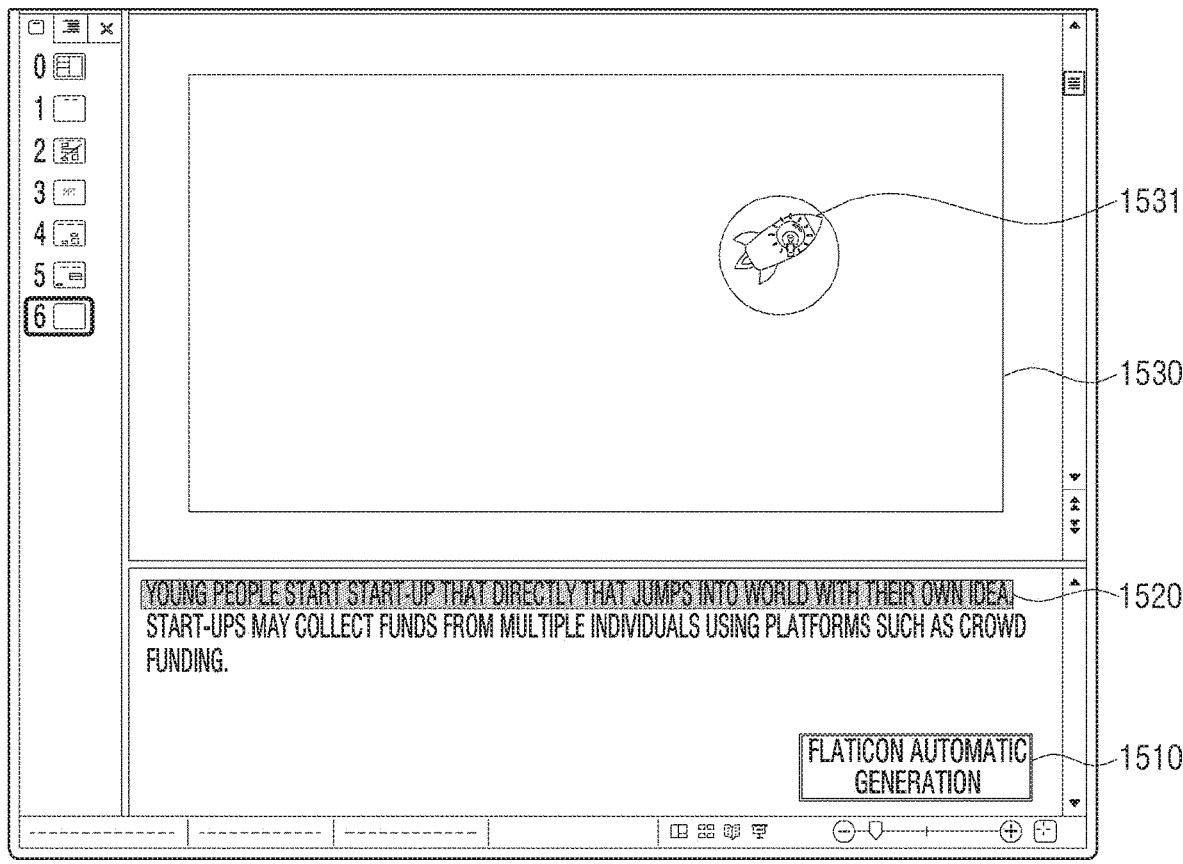
Figure 16:
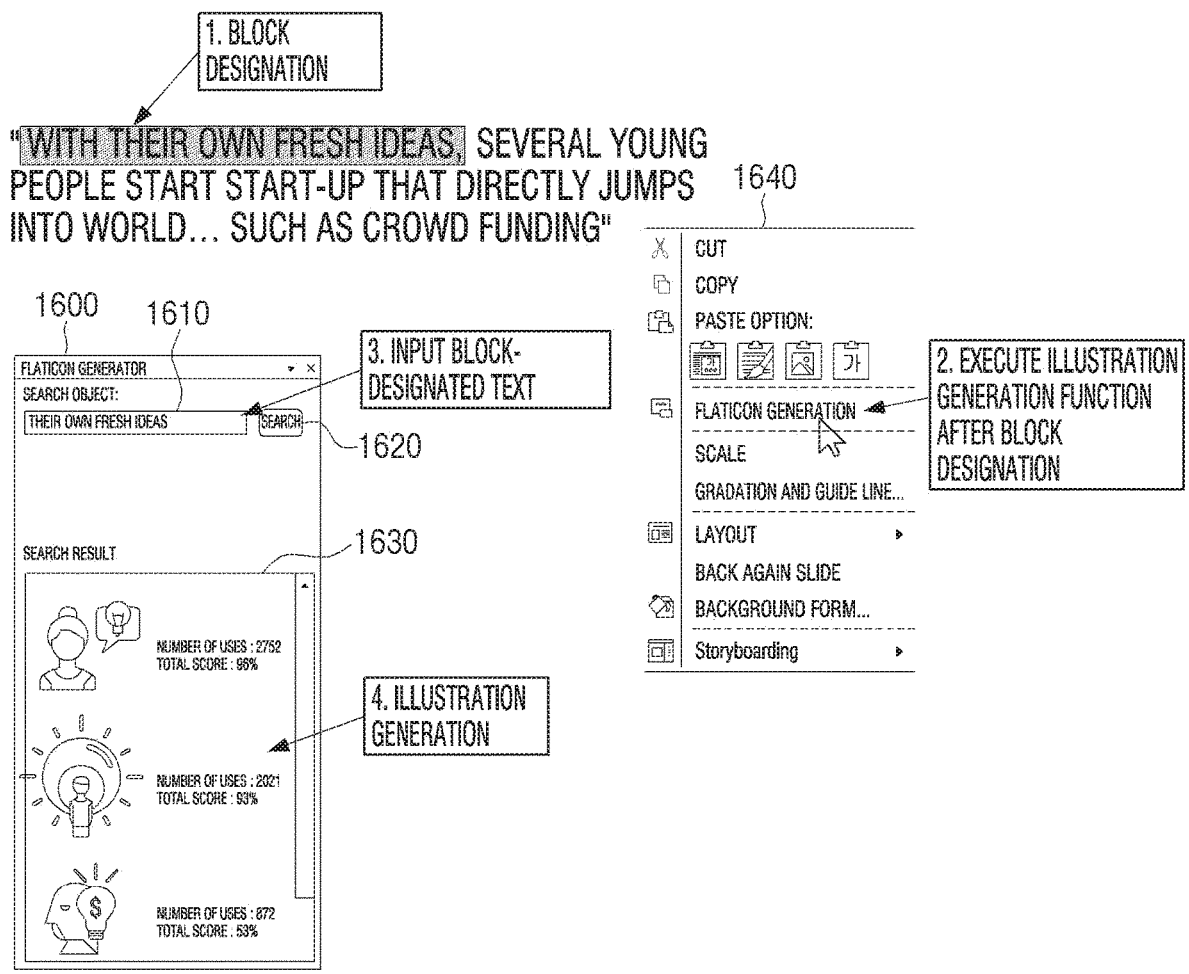

FIG. 13 is a diagram for describing a user interface for providing illustrations according to diverse embodiments of the disclosure, FIG. 14 is a diagram for describing a user interface for providing illustrations according to diverse embodiments of the disclosure, FIG. 15 is a diagram for describing a user interface for providing illustrations according to diverse embodiments of the disclosure, and FIG. 16 is a diagram for describing a user interface for providing illustrations according to diverse embodiments of the disclosure.

Referring to FIG. 13, an illustration generation function according to the disclosure may be included in presentation software. When an illustration creation menu 1310 among function menus provided by the presentation software is selected, a user interface (UI) 1320 for searching for an illustration may be displayed, and when the text is input into a text input area 1321 provided in the UI 1320 and a search 1323 is selected, a search result 1325 including at least one illustration associated with the text may be provided.

In the search result 1325, several illustrations may be listed according to scores evaluated by the number of uses by other users, the degree of design matching, and the like.

An illustration selected by the user among the illustrations included in the search result 1325 may be displayed on the presentation image 1330. The user may display the illustration on the presentation image 1330 by an operation such as clicking, dragging and dropping, long touch, or the like using an input device such as a mouse or a touch pad.

FIG. 14 is a diagram for describing a method for providing an illustration according to an embodiment of the disclosure and FIG. 15 is a diagram for describing a method for providing an illustration according to an embodiment of the disclosure.

Referring to FIG. 14, an illustration generation button 1410 may be provided in a script input window 1400 provided on the screen provided by the presentation software. When the user inputs the text to the script input window 1400 and selects the illustration generation button 1410, at least one illustration 1421 associated with the text may be displayed on the presentation image 1420.

Referring to FIG. 15, when the user designates a block of the text (e.g., dragging the text) to generate an illustration and selects an illustration generation button 1510, at least one illustration 1531 associated with a designated text 1520 may be displayed on the presentation image 1530. According to the embodiment, the illustration may be generated for each designated sentence.

FIG. 16 illustrates a method for providing an illustration according to an embodiment of the disclosure.

Referring to FIG. 16, when the user designates a block of the text (e.g., dragging the text) to generate an illustration and performs a specific operation for the block-designated text (e.g., pushes a right button of the mouse and long-presses the touch pad), a menu 1640 may be displayed, when the user selects an illustration generation item including the menu 1640, the block-designated text is input to a text input area 1610 of a UI 1600 for searching for an illustration, and thereafter, when the user selects a search 1620, a search result 1630 including at least one illustration associated with the block-designated text may be provided. In the search result 1630, several illustrations may be listed according to scores evaluated by the number of uses by other users, the degree of design matching, and the like.

According to an embodiment of the disclosure, by inputting the text to the artificial intelligence model performing the natural-language processing, the plurality of key terms may be extracted from the text, priorities of the plurality of key terms may be ranked, and information on the plurality of key terms and the priorities may be defined as a key term vector and may be input to the artificial intelligence model learned to generate the illustration to thereby generate the form of an illustration.

Specifically, if the user inputs a sentence, the sentence is input into the artificial intelligence model that performs the natural language processing, and the sentence is divided into a unit of phrases/paragraphs to detect the meaning of the corresponding phrase/paragraphs. In addition, a relationship between the respective phrases/paragraphs (background/phenomenon, cause/result, contrast, assertion and evidence, etc.) is defined. In addition, words of the sentence in the respective phrases/paragraphs are discriminated. In addition, each word is separately prioritized in the meanings of the phrase/paragraph in which each word is included. In addition, only N (e.g., two) words having a large priority are used to generate the illustrations by aligning the words of each phrase/paragraph according to the priority, and the remaining words may be ignored.

In addition, an association (subject and predicate, predicate and object, subject, predicate, and object, etc.) between N main words which are prioritized in the phrase/paragraph, and the degree of connection between the words are defined. For example, if a sentence "gradually growing start-up challenge" is input, core words such as 'growing (1)', 'start-up (2)', 'challenge (3), and 'gradually (4)' may be extracted and prioritized.

In this case, the core words may be shaped into the illustrations from a concept of a small range. For example, a first database may be constituted by templates for a layout of the illustrations defined according to the type of association between the words, and a second database may be constituted by templates for a layout of the illustrations defined according to the type of association between phrases/paragraphs. In addition, illustrations that match the meaning of each word may be searched and an illustration that matches at highest probability may be selected. The template is internally loaded and prepared by the association of the words, and the illustration matched from each word is inserted into the template to generate primary illustrations. In addition, according to the association between the phrases/paragraphs generated by the primary illustrations, the primary illustrations are inserted into the template loaded from the second database to generate a secondary illustration. The secondary illustration as described above may be defined as a basic form.

In addition, a graphic effect on the basic form of the illustration is automatically changed using the basic form of the illustration and the design of the current presentation image. For example, colors used in the design of the current presentation image may be listed, color theme information of the current presentation image by using frequency, area, and the like of the colors as a weight may be calculated, and the illustration of the basic form may be colored using the colors in the calculated color theme. Alternatively, a design of the current presentation image may be defined from design elements such as a line style, a line thickness, a curve frequency, an edge processing, and the like used in the design of the presentation image in addition to the color information, and the graphic effect of the illustration may be changed using the information.

The user may post-edit the illustration generated as described above. In addition, when the design of the presentation image is changed, the illustration may also be re-generated to be matched to the change in the design of the presentation image. It is possible for the user to select each template or primary illustration search, and the selection of the user may be scored to perform a reinforcement learning of the artificial intelligence model. In a template or illustration search using a reinforcement learning concept, results that users or individual users prefer may be gradually learned and shown.

Meanwhile, diverse embodiments of the disclosure may also be applied to a messenger program. FIG. 17 is a diagram for describing embodiments in which an illustration generation function according to the disclosure is applied to a messenger program and FIG. 18A is a diagram for describing embodiments in which an illustration generation function according to the disclosure is applied to a messenger program.

Referring to FIG. 17, when the user selects an emoticon button provided in a messenger UI of a messenger program and inputs a text for an emoticon to be generated, at least one emoticon associated with the input text may be generated and displayed. The user may select a desired emoticon among the generated emoticons and send the selected emoticon to a conversation partner. In addition, the user may generate an illustration that matches not only the emoticon but also the text and send them to the other party.

Referring to FIG. 18A, when the user selects a specific button (a letter envelope shape) provided in the messenger UI of the messenger program, a background image that matches the input text may be generated. In addition, the text input to a text window may be inserted into the background image. A position of the text may be changed by a user operation such as touch and drag. As described above, a message in the form of an image in which the text is inserted into the background image may be sent to a conversation partner.

Meanwhile, diverse embodiments of the disclosure may also be applied to a keyboard program. FIG. 18B is a diagram for describing an embodiment of the disclosure in which the illustration generation function is applied to a keyboard program.

Referring to FIG. 18B, when the user selects an illustration generation button 1810 provided in a UI of the keyboard program and inputs a text for an illustration to be generated, at least one illustration associated with the input text may be generated and displayed. The process of generating the illustrations may be performed by the method described with reference to FIGS. 1 to 12. The keyboard program may operate in conjunction with various other programs. For example, the keyboard program may operate in conjunction with a web browser program, a document creation program, a chatting program, a messenger program, or the like. That is, illustration information associated with the text input to the keyboard program may be acquired and may be transferred to the web browser program, the document creation program, the chatting program, or the messenger program.

FIG. 19 is a block diagram for describing a configuration of an electronic device 100 according to an embodiment of the disclosure. The electronic apparatus 100 is an apparatus capable of performing all or some of the operations of the embodiments described above with reference to FIGS. 1 to 18A.

Referring to FIG. 19, the electronic apparatus 100 includes a memory 110 and a processor 120.

For example, the memory 110 may include an internal memory or an external memory. The internal memory may include at least one of, for example, a volatile memory (for example, a dynamic random access memory (DRAM), a static RAM (SRAM), a synchronous dynamic RAM (SDRAM), or the like), a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, or the like), a flash memory (for example, a NAND flash, a NOR flash, or the like), a hard drive, or a solid state drive (SSD)).

The external memory may include a flash drive such as a compact flash (CF), a secure digital (SD), a micro secure digital (Micro-SD), a mini secure digital (Mini-SD), an extreme digital (xD), a multi-media card (MMC), a memory stick, or the like. The external memory may be functionally and/or physically connected to the electronic apparatus 100 through various interfaces.

The memory 110 is accessed by the processor 120, and readout, writing, correction, deletion, update, and the like, of data in the memory 110 may be performed by the processor 120. In the disclosure, a term 'memory' includes the memory 110, a read only memory (ROM) in the processor 120, a random access memory (RAM), or a memory card (for example, a micro secure digital (SD) card or a memory stick) mounted in the electronic apparatus 100.

The memory 110 may store computer executable instructions for performing the control method according to the embodiments described above with reference to FIGS. 1 to 18A.

The memory 110 may store presentation software, messenger software, and the like.

The memory 110 may store the artificial intelligence models according to the embodiments described above with reference to FIGS. 1 to 18A. The artificial intelligence model may be learned by an external server and may be provided to the electronic apparatus 100. The electronic apparatus 100 may download the artificial intelligence model from the external server and store the artificial intelligence model in the memory 110, and may receive and store an updated artificial intelligence model from the external server when the artificial intelligence model is updated (or re-learned). The electronic apparatus 100 may be connected to the external server through a local area network (LAN), an Internet network, or the like.

The memory 110 may store various databases such as a database constituted by illustrations to which tag information is matched, a database constituted by templates defining the form of layout of the illustrations according to an association of the words in the sentence, a database constituted by templates defining the form of layout of the illustrations according to an association between the phrases/paragraphs of the sentence, and the like.

According to an embodiment, the memory 110 may also be implemented as an external server of the electronic apparatus 100 such as a cloud server.

The processor 120 is a component for controlling an overall operation of the electronic apparatus 100. The processor 120 may be implemented by, for example, a central processing unit (CPU), an application specific integrated chip (ASIC), a system-on-a chip (SoC), a microcomputer (MICOM), or the like. The processor 120 may drive an operating system (OS) or an application program to control a plurality of hardware or software components connected to the processor 120 and perform various kinds of data processing and calculation. According to an embodiment, the processor 120 may further include a graphic processing unit (GPU) and/or an image signal processor.

The processor 120 executes the computer executable instructions stored in the memory 110 to enable the electronic apparatus 100 to perform the functions according to all or some of the embodiments described in FIGS. 1 to 18A.

The processor 120 may acquire the text based on the user input by executing at least one or more instructions stored in the memory 110, determine the plurality of key terms from the acquired text, acquire a plurality of first illustrations corresponding to the plurality of key terms, acquire a second illustration by synthesizing at least two or more first illustrations of the plurality of first illustrations, and output the acquired second illustration.

In addition, the processor 120 may provide the presentation image, acquire at least one illustration associated with the text by inputting the text to the artificial intelligence model learned by the artificial intelligence algorithm when the text for the presentation image is input, and provide an illustration selected by the user among one or more acquired illustrations onto the presentation image.

According to an embodiment, the electronic apparatus 100 may use a personal assistant program, which is an artificial intelligence dedicated program (or an artificial intelligence agent), to acquire the illustrations associated with the text. In this case, the personal assistant program is a dedicated program for providing an artificial intelligence based service, and may be executed by the processor 120. The processor 120 may be a general-purpose processor or a separate AI-dedicated processor.

According to an embodiment of the disclosure, the electronic apparatus 100 itself includes a display, and the processor 120 may control the display to display various images. According to another embodiment, the electronic apparatus 100 may be connected to an external display device to output an image signal to the external display device so that various images are displayed on the external display device. In the latter case, the electronic apparatus 100 may be connected to the external display device by wire or wirelessly. For example, the electronic apparatus 100 may include at least one of a component input jack, a high-definition multimedia interface (HDMI) input port, a USB port, or ports such as red, green, and blue (RGB), digital visual interface (DVI), HDMI, dynamic programming (DP), and thunderbolt, and may be connected to the external display device through such a port. As another example, the electronic apparatus 100 may be connected to the external display device through communication methods such as wireless fidelity (WiFi), wireless display (WiDi), wireless HD (WiHD), wireless home digital interface (WHDI), miracast, Wi-Fi direct, Bluetooth (e.g., Bluetooth classic), Bluetooth low energy, AirPlay, Zigbee, and the like.

The display included in the electronic apparatus 100 or the external display device connected to the electronic apparatus 100 may include, for example, a liquid crystal display (LCD), a light-emitting diode (LED) display, an organic light-emitting diode (OLED) display (e.g., active-matrix organic light-emitting diode (AMOLED), passive-matrix OLED (PMOLED), a microelectromechanical systems (MEMS) display, an electronic paper display, or a touchscreen.

In the disclosure, the processor 120 "providing" images, illustrations, icons, and the like includes controlling an internal display of the electronic apparatus 100 to display the images or the illustrations through the internal display, or outputting image signals for the images, the illustrations, and the like to the external display device of the electronic apparatus 100.

According to an embodiment of the disclosure, the electronic apparatus 100 itself may include an input device and may receive various user inputs through the input device. The input device may include, for example, a touch panel, a touch screen, a button, a sensor capable of receiving a motion input, a camera, or a microphone capable of receiving a voice input.

According to another embodiment, the electronic apparatus 100 may be connected to an external input device and receive various user inputs through the external input device. For example, the external input device may include a keyboard, a mouse, a remote controller, or the like. The electronic apparatus 100 may be connected to the external input device by wirelessly or wire. For example, the electronic apparatus 100 may be connected to the external input device by wire through a USB port or the like. Another example, the electronic apparatus 100 may be wirelessly connected to the external input device through communication methods such as infrared data association (IrDA), radio frequency identification (RFID), wireless fidelity (WiFi), Wi-Fi direct, Bluetooth (e.g., Bluetooth classic), Bluetooth low energy), Zigbee, and the like.

The electronic apparatus 100 may receive various user inputs such as a text for generating an illustration and a user input for selecting an illustration through the input device included in the electronic device 100 itself or the external input device.

According to an embodiment, the processor 120 may provide a screen provided with the text input window as illustrated in FIG. 1, and when the text is input to the text input window, the processor 120 may input the text to the artificial intelligence model to acquire at least one illustration associated with the text.

According to another embodiment, the processor 120 may provide the screen as illustrated in FIG. 13, and when an illustration generation menu 1310 is selected, the processor 120 may provide a UI 1320 for searching for an illustration. In addition, when the text is input to a text input area 1321 provided in the UI 1320 for searching for an illustration and a search 1323 is selected, the processor 120 may input the text to the artificial intelligence model to provide a search result 1325 including at least one illustration associated with the text. In addition, the processor 120 may provide an illustration selected from the search result 1325 to a presentation image 1330.

According to another embodiment, the processor 120 may provide the screen as illustrated in FIG. 14, and when the text is input to a script input window 1400 and an illustration generation button 1410 is selected, the processor 120 may input the input text to the artificial intelligence model to provide at least one illustration 1421 associated with the text.

According to another embodiment, the processor 120 may provide the screen as illustrated in FIG. 15, and when a user input for designating the text and a user input selecting an illustration generation button 1510 are received, the processor 120 may input the designated text 1520 to the artificial intelligence model to provide at least one illustration 1531 associated with the text.

According to another embodiment, the processor 120 may designate a block of the text as illustrated in FIG. 16 and provide a menu 1640 when a specific user operation for the block-designated text is input, and the processor 120 may provide a UI 1610 for searching for an illustration that the block-designated text is input to a text input area 1610 when an illustration generation item included in the menu 1640 is selected, and may input the block-designated text to the artificial intelligence model to provide a search result 1630 including at least one illustration associated with the text when a search 1620 is selected. In addition, the processor 120 may provide an illustration selected from the search result 1630 to the presentation image 1330.

According to an embodiment of the disclosure, the processor 120 may input the information on the design of the presentation image and the text to the artificial intelligence model to thereby acquire at least one illustration associated with the text and corresponding to the design of the presentation image.

For example, referring to FIG. 12, the processor 120 may input the text to the first artificial intelligence model 1210 to acquire at least one first illustration 1211, and may input the information on the design of the presentation image and at least one first illustration 1211 to the second artificial intelligence model 1220 to acquire at least one second illustration 1221 modified so that at least one first illustration 1211 corresponds to the design of the presentation image.

According to an embodiment, the processor 120 may input the text to the artificial intelligence model to acquire the plurality of illustrations associated with the text and having the same graphic effect as each other.

According to an embodiment, the processor 120 may input the text to the artificial intelligence model to acquire a plurality of first illustrations and acquire a second illustration in which the plurality of first illustrations are synthesized as the illustration associated with the text. For example, the processor 120 may acquire the illustration in which the plurality of illustrations is synthesized using the artificial intelligence model as described with reference to FIGS. 5 to 11.

According to an embodiment of the disclosure, the memory 120 may store the database including the illustrations matched to the tag information as described in FIG. 4. In this case, the processor 120 may input the text to the artificial intelligence model to acquire at least one key term from the text, and may search for an illustration corresponding to at least one acquired key term from the database stored in the memory 120. The database may also be stored in an external server of the electronic apparatus 100.

According to an embodiment of the disclosure, the processor 120 may re-learn the artificial intelligence model by applying feedback data including information on an illustration selected by the user among one or more illustrations acquired using the artificial intelligence model.

According to another embodiment of the disclosure, the processor 120 may input the text input to the UI provided by executing the messenger program to the artificial intelligence model to provide the emoticon associated with the text as described in FIG. 17 and provide the background image as described in FIG. 18A, for example.

Meanwhile, although it is described in the embodiment described above that only one electronic apparatus 100 is used, the embodiments described above may also be implemented using several apparatuses. This will be described with reference to FIGS. 20A, 20B, and 20C.

FIG. 20A is a flow chart of a network system using an artificial intelligence model according to diverse embodiments of the disclosure.

Referring to FIG. 20A, the network system using the artificial intelligence system may include a first component 2010a and a second component 2020a. For example, the first component 2010a may be an electronic apparatus such as a desktop, a smartphone, a tablet PC, or the like, and the second component 2020a may be a server in which the artificial intelligence model, the database, and the like are stored. Alternatively, the first component 2010a may be a general purpose processor and the second component 2020a may be an artificial intelligence dedicated processor. Alternatively, the first component 2010a may be at least one application and the second component 2020a may be an operating system (OS). That is, the second component 2020a is a component that is more integrated, dedicated, has less delay, has dominated performance, or has more resources than the first component 2010a, and may be a component capable of processing many calculations that are required at the time of generating, updating, or applying the model faster and more efficiently than the first component 2010a.

An interface for transmitting/receiving data between the first component 2010a and the second component 2020a may be defined.

As an example, an application program interface (API) having learning data to be applied to the model as an argument value (or an intermediate value or a transfer value) may be defined. The API may be defined as a set of subroutines or functions that may be called for any processing of another protocol (e.g., a protocol defined in the second component 2020a) in any one protocol (e.g., a protocol defined in the first component 2010a). That is, an environment in which an operation of another protocol may be performed in any one protocol through the API may be provided.

Referring to FIG. 20A, first, the first component 2010a may be input with a text at operation S2001a. The first component 2010a may be input with the text through various input devices such as a keyboard, a touchscreen, and the like. Alternatively, the first component 2010a may be input with a voice and converts the voice into a text. Here, the text may be a script for the presentation image or a text input to the text input window of the messenger program.

In addition, the first component 2010a may send the input text to the second component 2020a at operation S2003a. For example, the first component 2010a may be connected to the second component 2020a through a local area network (LAN) or an Internet network, or may be connected to the second component 2020a through a wireless communication (e.g., wireless communication such as GSM, UMTS, LTE, WiBRO, or the like) method.

The first component 2010a may send the input text as it is to the second component 2020a, or may perform a natural language processing on the input text and transmit it to the second component 2020a. In this case, the first component 2010*a* may store an artificial intelligence model for performing the natural language processing.

The second component 2020*a* may input a received text to the artificial intelligence model to acquire at least one illustration associated with the text at operation S2005*a*. The second component 2020*a* may store a database including various data necessary to generate the artificial intelligence model and the illustration. The second component 2020*a* may perform the operation using the artificial intelligence model according to the diverse embodiments described above.

In addition, the second component 2020*a* may send at least one acquired illustration to the first component 2010*a* at operation S2007*a*. In this case, for example, the second component 2020*a* may send at least one acquired illustration to the first component 2010*a* in the form of an image file. As another example, the second component 2020*a* may send information on a storage address (e.g., a URL address) of at least one acquired illustration to the first component 2010*a*.

The first component 2010*a* may provide the illustration received from the second component 2020*a* at operation S2009*a*. For example, the first component 2010*a* may display at least one received illustration through a display or an external display device included in the first component 2010*a* itself. The user may select and use an illustration desired to be used from one or more displayed illustrations. For example, the illustration may be used to create the presentation image, and may be used as an emoticon, a background, etc. to be sent to a conversation partner in a messenger program.

The artificial intelligence model as described above may be a determination model learned based on an artificial intelligence algorithm, for example, a model based on a neural network. The learned artificial intelligence model may be designed to simulate a human brain structure on a computer, and may include a plurality of network nodes having weights that simulate a neuron of the neural network of a human. The plurality of network nodes may each form a connection relationship so that the neuron simulates synaptic activity of the neuron exchanging a signal via synapse. In addition, the learned artificial intelligence model may include, for example, a neural network model or a deep learning model developed from the neural network model. In the deep learning model, the plurality of network nodes may exchange data according to a convolution connection relationship while being located at different depths (or layers). Examples of the learned artificial intelligence model may include a deep neural network (DNN), a recurrent neural network (RNN), a bidirectional recurrent deep neural network (BRDNN), and the like, but are not limited thereto.

According to an embodiment, the first component 2010*a* may use a personal assistant program, which is an artificial intelligence dedicated program (or an artificial intelligence agent), to acquire the illustrations associated with the text described above. In this case, the personal assistant program is a dedicated program for providing an artificial intelligence based service, and may be executed by an existing general purpose processor or a separate AI dedicated processor.

Specifically, when a predetermined user input (e.g., an icon touch corresponding to a personal assistant chatbot, a user voice including a predetermined word, or the like) is input, or a button (e.g., a button for executing the artificial intelligence agent) included in the first component 2010*a* is pressed, the artificial intelligence agent may be operated (or executed). In addition, the artificial intelligence agent may send the text to the second component 2020*a*, and may provide at least one illustration received from the second component 2020*a*.

Of course, when a predetermined user input is detected on the screen or the button (e.g., the button for executing the artificial intelligence agent) included in the first component 2010*a* is pressed, the artificial intelligence agent may also be operated. Alternatively, the artificial intelligence agent may be in a pre-executed state before the predetermined user input is detected or the button included in the first component 2010*a* is selected. In this case, after the predetermined user input is detected or the button included in the first component 2010*a* is selected, the artificial intelligence agent of the first component 2010*a* may acquire the illustration based on the text. In addition, the artificial intelligence agent may be in a standby state before the predetermined user input is detected or the button included in the first component 2010*a* is selected. Here, the standby state is a state in which a reception of a predefined user input is detected to control a start of an operation of the artificial intelligence agent. When the predetermined user input is detected or the button included in the first component 2010*a* is selected while the artificial intelligence agent is in the standby state, the first component 2010*a* may operate the artificial intelligence agent and provide the illustration acquired based on the text.

As another embodiment of the disclosure, when the first component 2010*a* directly acquires at least one illustration associated with the text using the artificial intelligence model, the artificial intelligence agent may control the artificial intelligence model to acquire at least one illustration associated with the text. In this case, the artificial intelligence agent may perform the operation of the second component 2020*a* described above.

FIG. 20B is a flow chart of a network system using an artificial intelligence model according to an embodiment of the disclosure.

Referring to FIG. 20B, a network system using an artificial intelligence system may include a first component 2010*b*, a second component 2020*b*, and a third component 2030*b*. For example, the first component 2010*b* may be an electronic apparatus such as a desktop, a smartphone, a tablet PC, or the like, the second component 2020*b* may be a server running presentation software such as Microsoft PowerPoint™, KeyNote™, or the like, and the third component 2030*b* may be a server in which an artificial intelligence model or the like that performs a natural language processing is stored.

An interface for transmitting/receiving data between the first component 2010*b*, the second component 2020*b*, and the third component 2030*b* may be defined.

Referring to FIG. 20B, first, the first component 2010*b* may be input with a text at operation S2001*b*. The first component 2010*b* may be input with the text through various input devices such as a keyboard, a touchscreen, and the like. Alternatively, the first component 2010*b* may be input with a voice and converts the voice into a text.

Thereafter, the first component 2010*b* may send the input text to the third component 2030*b* at operation S2003*b*. For example, the first component 2010*b* may be connected to the third component 2030*b* through a local area network (LAN) or an Internet network, or may be connected to the third component 2030*b* through a wireless communication (e.g., wireless communication such as GSM, UMTS, LTE, WiBRO, or the like) method.

The third component 2030*b* may input the received text to the artificial intelligence model to acquire at least one key term associated with the text and an association between the key terms at operation S2005b. The third component 2030b may send the key term and the association between the key terms to the second component 2020b at operation S2007b.

The second component 2020b may generate a synthesize illustration using the received key term and association between the key terms at operation S2009b. The second component 2020b may transfer the generated synthesized illustration to the first component 2010b at operation S2011b. For example, the first component 2010b may display at least one received illustration through a display or an external display device included in the first component 2010b itself. For example, the illustration may be used to create the presentation image, and may be used as an emoticon, a background, etc. to be sent to a conversation partner in a messenger program.

FIG. 20C is a configuration diagram of a network system according to an embodiment of the disclosure.

Referring to FIG. 20C, a network system using an artificial intelligence model may include a first component 2010c and a second component 2020c. For example, the first component 2010c may be an electronic apparatus such as a desktop, a smartphone, a tablet PC, or the like, and the second component 2020c may be a server in which the artificial intelligence model, the database, and the like are stored.

The first component 2010c may include an inputter 2012c and an outputter 2014c. The inputter 2012c may be input a text through an input device. The input device may include, for example, a keyboard, a touchpad, a mouse, a button, or the like. The input device may be embedded in the first component 2010c or may be an external input device connected to the first component 2010c. The outputter 2014c may output an image through an output device. For example, the outputter 2014c may output an illustration based on information received from the second component 2020c through the output device. The output device may include, for example, a liquid crystal display (LCD), a light emitting diode (LED) display, an organic light emitting diode (OLED) display, microelectromechanical systems (MEMS) display, an electronic paper display, or a touchscreen. The output device may be embedded in the first component 2010c or may be an external output device connected to the first component 2010c.

The second component 2020c may include a natural language processor 2022c, a database 2026c, and an illustration generator 2024c.

When the received text is input, the natural language processor 2022c may extract key terms from the text using the artificial intelligence model and detect an association and a context between the key terms.

The database 2026c may store illustrations matched to tag information. For example, the illustrations matched to the tag information including the key terms output from the natural language processor 2022c may be searched from the database.

The illustration generator 2024c may generate a synthesized illustration by combining a plurality of illustrations searched from the database 2026c based on the received key terms and the association between the key terms.

Although the natural language processor 2022c and the illustration generator 2024c according to an embodiment of the disclosure are illustrated as being included in one server, this is merely one example. For example, the natural language processor 2022c and the illustration generator 2024c may also be included in a separate server, and may also be included in the first component 2010c.

FIG. 21 is a block diagram illustrating a configuration of an electronic apparatus for learning and using an artificial intelligence model according to an embodiment of the disclosure.

Referring to FIG. 21, an electronic apparatus 2100 includes a learner 2110 and a determiner 2120. The electronic apparatus 2100 of FIG. 21 may correspond to the electronic apparatus 100 of FIG. 19 and the second component 2020a of FIG. 20A.

The learner 2110 may generate and learn an artificial intelligence model having a reference for acquiring at least one image (an illustration, an emoticon, or the like) associated with a text using learning data. The learner 2110 may generate an artificial intelligence model having a determination reference using collected learning data.

As an example, the learner 2110 may generate, learn, or re-learn the artificial intelligence model so as to acquire an image associated with the text by using the text and the image as the learning data. In addition, the learner 2110 may generate, learn, or re-learn the artificial intelligence model for modifying the image so as to correspond to the design of the presentation by using information on the image and the design of the presentation as the learning data.

The determiner 2120 may acquire the image associated with the text by using a predetermined data as input data of the learned artificial intelligence model.

As an example, the determiner 2120 may acquire the image associated with the text by using the text as the input data of the learned artificial intelligence model. As another example, the determiner 2120 may modify the image so as to correspond to the design of the presentation by using the information on the image and the design of the presentation as the input data of the artificial intelligence model.

At least a portion of the learner 2110 and at least a portion of the determiner 2120 may be implemented in a software module or manufactured in the form of at least one hardware chip and may be mounted in the electronic apparatus 100 or the second component 2020. For example, at least one of the learner 2110 or the determiner 2120 may also be manufactured in the form of a dedicated hardware chip for artificial intelligence (AI), or may be manufactured as a portion of an existing general purpose processor (e.g., CPU or application processor) or a graphic dedicated processor (e.g., GPU) and mounted in a variety of electronic apparatuses. In this case, the dedicated hardware chip for artificial intelligence is a dedicated processor specialized in a probability calculation, and has higher parallel processing performance than the general purpose processor of the related art, so it may quickly process calculation operations in an artificial intelligence field such as machine learning. When the learner 2110 and the determiner 2120 are implemented as a software module (or a program module including instructions), the software module may be stored in a non-transitory computer readable media. In this case, the software module may be provided by an operating system (OS), or may be provided by a predetermined application. Alternatively, some of the software modules may be provided by the operating system (OS), and the remaining of the software modules may be provided by the predetermined application.

In this case, the learner 2110 and the determiner 2120 may also be mounted in one electronic apparatus, or may also be mounted in separate electronic apparatuses, respectively. In addition, the learner 2110 and the determiner 2120 may also provide model information constructed by the learner 2110 to the determiner 2120 by wired or wireless line, and the data input to the learner 2110 may also be provided to the learner 2110 as additional learning data.

FIGS. 21 and 22 are block diagrams of the learner 2110 and the determiner 2120 according to diverse embodiments of the disclosure.

Referring to FIG. 21, the learner 2110 according to some embodiments may include a learning data acquirer 2110-1 and a model learner 2110-4. In addition, the learner 2110 may selectively further include at least one of a learning data pre-processor 2110-2, a learning data selector 2110-3, or a model evaluator 2110-5.

The learning data acquirer 2110-1 may acquire learning data necessary for an artificial intelligence model for acquiring at least one image associated with a text. As an embodiment of the disclosure, the learning data acquirer 2110-1 may acquire information on the text, the image, the design of the presentation, and the like as the learning data. The learning data may be data collected or tested by the learner 2110 or a manufacturer of the learner 2110.

The model learner 2110-4 may learn the artificial intelligence model so as to have a reference of acquiring the image associated with the text, using the learning data. As an example, the model learner 2110-4 may learn the artificial intelligence model through supervised learning using at least a portion of the learning data as the reference for acquiring the image associated with the text. Alternatively, the model learner 2110-4 may learn the artificial intelligence model through unsupervised learning of finding the reference for acquiring the image associated with the text by self-learning using the learning data without any supervision, for example. For example, the model learner 2110-4 may learn the artificial intelligence model using a generative adversarial network (GAN) technology. In addition, the model learner 2110-4 may learn the artificial intelligence model through reinforcement learning using a feedback as to whether a determination result according to the learning is correct, for example. In addition, the model learner 2110-4 may learn the artificial intelligence model using a learning algorithm or the like including, for example, error back-propagation or gradient descent.

In addition, the model learner 2110-4 may learn a selection reference about which learning data should be used to acquire the image associated with the text using the input data.

When there is a plurality of pre-constructed artificial intelligence models, the model learner 2110-4 may determine an artificial intelligence model having a great relation between the input learning data and basic learning data as an artificial intelligence model to be learned. In this case, the basic learning data may be pre-classified for each type of data, and the artificial intelligence model may be pre-constructed for each type of data. For example, the basic learning data may be pre-classified by various references such as an area in which the learning data is generated, a time at which the learning data is generated, a size of the learning data, a genre of the learning data, a generator of the learning data, types of objects in the learning data, and the like.

When the artificial intelligence model is learned, the model learner 2110-4 may store the learned artificial intelligence model. For example, the model learner 2110-4 may store the learned artificial intelligence model in the memory 110 of the electronic apparatus 100 or the memory of the second component 2020.

The artificial intelligence model learned from the text and image set has learned characteristics of the image form with respect to contents that the text means.

The artificial intelligence model learned from the information on the design of the presentation image and the image set has learned what the image has characteristics for the design of the presentation image.

The learner 2110 may further include the learning data pre-processor 2110-2 and the learning data selector 2110-3 to improve the determination result of the artificial intelligence model or to save resources or time required for the generation of the artificial intelligence model.

The learning data pre-processor 2110-2 may pre-process the acquired data so that the acquired data may be used for learning to acquire the image associated with the text. The learning data pre-processor 2110-2 may process the acquired data into a predetermined format so that the model learner 2110-4 may use the acquired data to acquire the image associated with the text. For example, the learning data pre-processor 2110-2 may remove texts (e.g., adverb, interjection, etc.) that are not needed when the artificial intelligence model provides a response among the input texts.

The learning data selector 2110-3 may select data necessary for learning from the data acquired by the learning data acquirer 2110-1 or the data pre-processed by the learning data pre-processor 2110-2. The selected learning data may be provided to the model learner 2110-4. The learning data selector 2110-3 may select learning data necessary for learning among the acquired or pre-processed data, depending on a predetermined selection reference. In addition, the learning data selector 2110-3 may also select the learning data according to a predetermined selection reference by learning by the model learner 2110-4.

The learner 2110 may further include a model evaluator 2110-5 to improve the determination result of the artificial intelligence model.

The model evaluator 2110-5 may input evaluation data to the artificial intelligence model, and when the determination result outputted from the evaluation data does not satisfy the predetermined reference, the model evaluator 2110-5 may cause the model learner 2110-4 to learn again. In this case, the evaluation data may be predefined data for evaluating the artificial intelligence model.

For example, when the number or ratio of the evaluation data in which the determination result is not correct among the determination results of the learned artificial intelligence model for the evaluation data exceeds a predetermined threshold value, the model evaluator 2110-5 may evaluate that the predetermined reference is not satisfied.

Meanwhile, when a plurality of learned artificial intelligence models exist, the model evaluator 2110-5 may evaluate whether each of the learned artificial intelligence models satisfies the predetermined reference, and determine a model satisfying the predetermined reference as a final artificial intelligence model. In this case, when there are a plurality of models satisfying the predetermined reference, the model evaluator 2110-5 may determine any one or a predetermined number of models previously set in descending order of evaluation score as the final artificial intelligence model.

Referring to FIG. 23, the determiner 2120 according to some embodiments may include an input data acquirer 2120-1 and a determination result provider 2120-4.

In addition, the determiner 2120 may selectively further include at least one of an input data pre-processor 2120-2, an input data selector 2120-3, or a model updater 2120-5.

The input data acquirer 2120-1 may acquire data necessary to acquire at least one image associated with the text. The determination result provider 2120-4 may acquire at least one image associated with the text by applying the input data acquired by the input data acquirer 2120-1 to the learned artificial intelligence model as an input value. The determination result provider 2120-4 may acquire the determination result by applying the data selected by the input data pre-processor 2120-2 or the input data selector 2120-3 to be described later to the artificial intelligence model as an input value.

As an embodiment, the determination result provider 2120-4 may acquire at least one image associated with the text by applying the text acquired by the input data acquirer 2120-1 to the learned artificial intelligence model.

The determiner 2120 may further include the input data pre-processor 2120-2 and the input data selector 2120-3 to improve the determination result of the artificial intelligence model or to save resources or time for provision of the determination result.

The input data pre-processor 2120-2 may pre-process the acquired data so that the acquired data may be used to acquire at least one image associated with the text. The input data pre-processor 2120-2 may process the acquired data into a predetermined format so that the determination result provider 2120-4 may use the acquired data to acquire at least one image associated with the text.

The input data selector 2120-3 may select data necessary for response provision from the data acquired by the input data acquirer 2120-1 or the data pre-processed by the input data pre-processor 2120-2. The selected data may be provided to the determination result provider 2120-4. The input data selector 2120-3 may select some or all of the acquired or pre-processed data, depending on a predetermined selection reference for response provision. In addition, the input data selector 2120-3 may also select the data according to a predetermined selection reference by learning by the model learner 2110-4.

The model updater 2120-5 may control the artificial intelligence model to be updated based on the evaluation for the determination result provided by the determination result provider 2120-4. For example, the model updater 2120-5 may request the model learner 2110-4 to additional learn or update the artificial intelligence model by providing the determination result provided by the determination result provider 2120-4 to the model learner 2110-4. In particular, the model updater 2120-5 may re-learn the artificial intelligence model based on the feedback information according to the user input.

According to the diverse embodiments described above, when documents such as presentation materials, newspapers, books, and the like are created, because scripts input to the document, articles, images, illustrations, and the like that match the contents of the books may be immediately generated, it is possible to reduce an effort for the user to separately search for the images, the illustrations, and the like. In addition, because similar illustrations in terms of the design may be acquired by the artificial intelligence model, it is possible to create uniform materials.

Meanwhile, it will be apparent to those skilled in the art that the presentation material creation method described in the above embodiments may be applied to any field requiring the images that match the text, such as the books, magazines, newspapers, advertisements, webpage production, and the like.

The diverse embodiments described above may be implemented in software, hardware, or a combination thereof. According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. According to a software implementation, the embodiments such as procedures and functions described in the disclosure may be implemented by separate software modules. Each of the software modules may perform one or more functions and operations described in the specification.

The diverse embodiments of the disclosure may be implemented in software including instructions that may be stored in machine-readable storage media readable by a machine (e.g., a computer). The machine is an apparatus that invokes the stored instructions from the storage medium and is operable according to the called instruction, and may include the electronic apparatus (e.g., the electronic apparatus 100) according to the disclosed embodiments. When the instruction is executed by the processor, the processor may perform a function corresponding to the instruction, either directly or using other components under the control of the processor. The instruction may include a code generated or executed by a compiler or an interpreter. The machine-readable storage medium may be provided in the form of a non-transitory storage medium. Here, the 'transitory' means that the storage medium does not include a signal and is tangible, but does not distinguish whether data is stored semi-permanently or temporarily in the storage medium.

According to an embodiment, the method according to the diverse embodiments disclosed in the disclosure may be included and provided in a computer program product. The computer program product may be traded as a product between a seller and a purchaser. The computer program product may be distributed in the form of a storage medium (for example, a compact disc read only memory (CD-ROM)) that may be read by a machine, or online through an application store (for example, PlayStore™). In the case of the online distribution, at least a portion of the computer program product may be at least temporarily stored in a storage medium such as a memory of a server of a manufacturer, a server of an application store, or a relay server, or be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be performed in a sequential, parallel, iterative, or heuristic manner, or at least some operations may be executed in a different order or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling an electronic apparatus, the method comprising:
   providing a user interface (UI) comprising an illustration generation icon on a display of the electronic apparatus;
   displaying a text on a first area of the UI based on a first input of a user;
   identifying a plurality of key terms from the text;
   in response to a selection of the illustration generation icon, acquiring at least one image corresponding to the plurality of key terms based on a first artificial intelligence model, wherein each of the at least one image is acquired based on the plurality of key terms;
   displaying a plurality of illustrations by synthesizing at least two images from among the at least one image on a second area of the UI different from the first area of the UI based on a second artificial intelligence model, each illustration of the plurality of illustrations including the text and the at least one image, wherein the plurality of illustrations include two or more illustrations having different arrangements between the text and the at least one image;
   displaying, based on a second input of the user for selecting a first illustration of the plurality of illustrations being received, the selected first illustration on the first area of the display while the plurality of illustrations displayed on the second area of the UI is maintained; and
   based on a third input of the user for modifying the at least one image included in the first illustration, displaying, on the first area of the display, a second illustration modified to correspond to the third input of the user,
   wherein background style of the plurality of illustrations is determined according to a selection of the user,
   wherein, in the displaying of the plurality of illustrations, each of the plurality of illustrations is modified so that the at least two images of the at least one image correspond to a design of a presentation image which is acquired by inputting the information on the design of the presentation image and the at least one image to the second artificial intelligence model as an input image, and
   wherein the input image is modified by the second artificial intelligence model according to the design of the presentation image in relation to at least one of a theme, a line style, a line thickness, a color, a size, a graphic effect, a brightness, a contrast, a shape, a layout, and synthesis of the input image to produce a style of the presentation image.

2. The method as claimed in claim 1, wherein the displaying of the text on a first area of the UI based on the first input of the user includes:
   receiving a voice input of the user;
   acquiring utterance information of the user by analyzing the received voice input; and
   displaying the text corresponding to the acquired utterance information of the user on the first area of the UI.

3. The method as claimed in claim 1, wherein the displaying of the text on the first area of the UI based on the first input of the user includes:
   providing the presentation image; and
   displaying the text for the presentation image on a first area of the UI based on the first input of the user.

4. The method as claimed in claim 3, wherein, in the acquiring of the at least one image, at least one image associated with the text and corresponding to a design of the presentation image are acquired by inputting information on the design of the presentation image and the text to the first artificial intelligence model.

5. The method as claimed in claim 4, wherein, in the acquiring of the at least one image, at least one image associated with the text and having a same graphic effect as each other are acquired by inputting the text to the first artificial intelligence model.

6. The method as claimed in claim 1, wherein, in the displaying of the plurality of illustrations, each of the plurality of illustrations is displayed by disposing and synthesizing the at least one image according to a context of the plurality of key terms.

7. The method as claimed in claim 4, further comprising:
   re-learning the first artificial intelligence model by applying feedback data including information on an illustration selected by the user among the acquired at least one image to the first artificial intelligence model.

8. The method as claimed in claim 4, wherein the first artificial intelligence model includes an artificial intelligence model learned by a generative adversarial network (GAN).

9. The method as claimed in claim 1, wherein in the acquiring of the at least one image, the at least one image corresponding to the plurality of key terms are searched and acquired from a pre-stored database.

10. The method as claimed in claim 1, wherein the style of the presentation image is defined by the second artificial intelligence model from design elements comprising at least one of the line style, the line thickness, a curve frequency, and an edge processing used in the design of the presentation image in addition to the color information, and may change a graphic effect of the at least one image using the information.

11. The method as claimed in claim 1,
    wherein dynamic motion or sound effects are applied to the presentation image by the second artificial intelligence model, and
    wherein a movement in a portion of the presentation image is applied to the presentation image by the second artificial intelligence model, the movement comprising at least one of a rotation, a blinking, and a shaking.

12. An electronic apparatus comprising:
    a display;
    a memory storing one or more instructions; and
    at least one processor coupled to the memory,
    wherein the at least one processor is configured to execute the one or more instructions to:
       provide a user interface (UI) comprising an illustration generation icon on the display of the electronic apparatus,
       display a text on a first area of the UI based on a first input of the user,
       identify a plurality of key terms from the text,
       in response to a selection of the illustration generation icon, acquire at least one image corresponding to the plurality of key terms based on a first artificial intelligence model, wherein each of the at least one image is acquired based on the plurality of key terms,
       display a plurality of illustrations by synthesizing at least two images from among the at least one image on a second area of the UI different from the first area of the UI based on a second artificial intelligence model, each illustration of the plurality of illustrations including the text and the at least one image, wherein the plurality of illustrations include two or more illustrations having different arrangements between the text and the at least one image, display, based on a second input of the user for selecting a first illustration of the plurality of illustrations being received, the selected first illustration on the first area of the display while the plurality of illustrations displayed on the second area of the UI is maintained, and based on a third input of the user for modifying the at least one image included in the first illustration, display, on the first area of the display, a second illustration modified to correspond to the third input of the user, wherein background style of the plurality of illustrations is determined according to a selection of the user, wherein, in the displaying of the plurality of illustrations, each of the plurality of illustrations is modified so that the at least two images of the at least one image correspond to a design of a presentation image which is acquired by inputting information on the design of the presentation image and the at least one image to the second artificial intelligence model as an input image, and wherein the input image is modified by the second artificial intelligence model according to the design of the presentation image in relation to at least one of a theme, a line style, a line thickness, a color, a size, a graphic effect, a brightness, a contrast, a shape, a layout, and a synthesis of the input image.

13. The electronic apparatus as claimed in claim 12, wherein the at least one processor is further configured to:
receive a voice input of the user,
acquire utterance information of the user by analyzing the received voice input, and
display the text corresponding to the acquired utterance information of the user on the first area of the UI.

14. The electronic apparatus as claimed in claim 12, wherein the at least one processor is further configured to:
provide the presentation image, and
display the text for the presentation image based on the input of the user on the first area of the UI.

15. The electronic apparatus as claimed in claim 14, wherein the at least one processor is further configured to acquire the at least one image associated with the text and corresponding to the design of the presentation image by inputting the information on the design of the presentation image and the text to the first artificial intelligence model.

16. The electronic apparatus as claimed in claim 15, wherein the at least one processor is further configured to acquire at least one image associated with the text and having a same graphic effect as each other by inputting the text to the first artificial intelligence model.

17. The electronic apparatus as claimed in claim 12, wherein the at least one processor is further configured to display the plurality of illustrations by disposing and synthesizing the at least one image according to a context of the plurality of key terms.

18. The electronic apparatus as claimed in claim 15, wherein the at least one processor is further configured to re-learn the first artificial intelligence model by applying feedback data including information on an illustration selected by the user among the acquired at least one image to the first artificial intelligence model.

19. The electronic apparatus as claimed in claim 15, wherein the first artificial intelligence model includes an artificial intelligence model learned by a generative adversarial network (GAN).

20. The electronic apparatus as claimed in claim 12, wherein the plurality of illustrations further include at least one of an emoticon, a pictogram or an infographic.

* * * * *